(12) United States Patent
Branyon, III et al.

(10) Patent No.: US 11,535,356 B2
(45) Date of Patent: Dec. 27, 2022

(54) PRESSURE BULKHEAD ASSEMBLY SUPPORT TOOL

(71) Applicant: The Boeing Company, Chicago, IL (US)

(72) Inventors: Charlie E. Branyon, III, Summerville, SC (US); Dennis R. Mathis, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/304,968

(22) Filed: Jun. 29, 2021

(65) Prior Publication Data
US 2021/0323652 A1    Oct. 21, 2021

Related U.S. Application Data

(62) Division of application No. 16/526,724, filed on Jul. 30, 2019, now Pat. No. 11,077,929.

(51) Int. Cl.
| | |
|---|---|
| *B64F 5/10* | (2017.01) |
| *B64C 1/06* | (2006.01) |
| *B64C 1/12* | (2006.01) |
| *B64C 1/10* | (2006.01) |

(52) U.S. Cl.
CPC ............... *B64C 1/069* (2013.01); *B64C 1/10* (2013.01); *B64C 1/12* (2013.01); *B64C 1/064* (2013.01); *B64F 5/10* (2017.01); Y10S 269/909 (2013.01); Y10T 29/53961 (2015.01); Y10T 29/53974 (2015.01); Y10T 428/24174 (2015.01)

(58) Field of Classification Search
None
See application file for complete search history.

(56) References Cited

U.S. PATENT DOCUMENTS

| | | |
|---|---|---|
| 2010/0243806 A1 | 9/2010 | Vera Villares et al. |
| 2019/0039711 A1 | 2/2019 | Diep et al. |
| 2021/0031898 A1 | 2/2021 | Branyon, III et al. |

OTHER PUBLICATIONS

Office Action, dated Mar. 4, 2021, regarding U.S. Appl. No. 16/526,724, 10 pages.
Notice of Allowance, dated Apr. 6, 2021, regarding U.S. Appl. No. 16/526,724, 8 pages.

*Primary Examiner* — Alexander S Thomas
(74) *Attorney, Agent, or Firm* — Yee & Associates, P.C.

(57) ABSTRACT

A pressure bulkhead assembly support tool configured to hold a pressure bulkhead system is presented. The pressure bulkhead assembly support tool comprises a segmented frame having a substantially circular path. A plurality of circumferential force assemblies restrains the pressure bulkhead system such that a circumferential surface of the pressure bulkhead system with a nominal shape is formed. A plurality of alignment probes holds and positions the pressure bulkhead system relative to the segmented frame.

20 Claims, 26 Drawing Sheets

# PRESSURE BULKHEAD ASSEMBLY SUPPORT TOOL

CROSS-REFERENCE TO RELATED APPLICATION

This application is a divisional application of U.S. patent application Ser. No. 16/526,724, filed Jul. 30, 2019, now U.S. Pat. No. 11,077,929 which is herein incorporated by reference.

BACKGROUND INFORMATION

1. Field

The present disclosure relates generally to pressure bulkheads for aircraft applications. More specifically, the present disclosure relates to a pressure bulkhead assembly support tool for assembling a pressure bulkhead system for joining an aft pressure bulkhead to two sections of an aircraft.

2. Background

Pressure bulkheads are often used in aircraft to separate a pressurized section of the fuselage from an unpressurized section. In some applications, the pressure bulkhead is mounted to the skin of one or more sections of the fuselage.

Manufacturing and installation for pressure bulkheads may involve many processes, such as drilling, deburring, shimming, and fay surface sealing. Installing conventional pressure bulkheads involves significant shimming between the aft pressure bulkhead and the skin. Installing shims between the aft pressure bulkhead and the skin may be more complex, more time-consuming, or more expensive than desired.

Therefore, it would be desirable to have a method, apparatus, and tool that takes into account at least some of the issues discussed above, as well as other possible issues.

SUMMARY

An illustrative embodiment of the present disclosure provides a pressure bulkhead assembly support tool. The pressure bulkhead assembly support tool comprises a segmented frame having a substantially circular path; a plurality of circumferential force assemblies positioned along the substantially circular path, and a plurality of alignment probes positioned along the substantially circular path. The plurality of circumferential force assemblies is configured to restrain skin splice angles of a pressure bulkhead system such that a circumferential surface with a nominal shape is formed. The plurality of alignment probes is configured to hold an aft pressure bulkhead having a bulkhead interface surface.

Another illustrative embodiment of the present disclosure provides a pressure bulkhead assembly support tool configured to hold a pressure bulkhead system. The pressure bulkhead assembly support tool comprises a segmented frame comprising multiple frame segments separable from each other. The pressure bulkhead assembly support tool further comprises a plurality of circumferential force assemblies and a plurality of alignment probes positioned on the segmented frame. The plurality of circumferential force assemblies comprises a circumferential surface clamp configured to apply pressure to mating edges of skin splice angles of the pressure bulkhead system and indexing pins configured to position the mating edges of the skin splice angles. The plurality of alignment probes configured to hold a bulkhead interface surface of an aft pressure bulkhead of the pressure bulkhead system and also configured to align the aft pressure bulkhead relative to the segmented frame once the aft pressure bulkhead is lowered onto the skin splice angles, wherein a plurality of shims is positioned between the bulkhead interface surface and a flange surface of the skin splice angles.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that some components may be more difficult or time-consuming to install due to limited access. The illustrative embodiments recognize and take into account that shimming some components may be more difficult than desired due to ergonomic factors for human operators. The illustrative embodiments recognize and take into account that shimming between a pressure bulkhead system and a skin of a fuselage of an aircraft takes at least one of an undesirable amount of time or an undesirable amount of labor.

The illustrative embodiments recognize and take into account that in conventional manufacturing for pressure bulkhead systems, the aft pressure bulkhead is restrained and the skin splice angles are individually indexed and joined to the aft pressure bulkhead. Individually indexing and joining the skin splice angles to the aft pressure bulkhead forms a circumferential surface. The illustrative embodiments recognize and take into account that the tolerances in the manufacturing of at least one of the aft pressure bulkhead or the skin splice angles contribute to out of tolerance conditions for the circumferential surface. The illustrative embodiments recognize and take into account that if the pressure bulkhead system has a circumferential surface that is in tolerance, shimming may be reduced or eliminated.

The illustrative examples present a pressure bulkhead system having a plurality of shims between the skin splice angles and the aft pressure bulkhead of the pressure bulkhead system. The plurality of shims is manufactured and placed to maintain a nominal shape of a circumferential surface of the pressure bulkhead system. The circumferential surface is configured to be joined to a skin of a fuselage of an aircraft. The illustrative examples also present a method of forming the pressure bulkhead system and a pressure bulkhead assembly support tool configured to position and secure the skin splice angles and the aft pressure bulkhead. By positioning the plurality of shims between the skin splice angles and the aft pressure bulkhead, the nominal shape of the circumferential surface is maintained. By positioning the plurality of shims between the skin splice angles and the aft pressure bulkhead, the quantity of shims installed between the circumferential surface and a skin of a fuselage is reduced.

Figure 1:
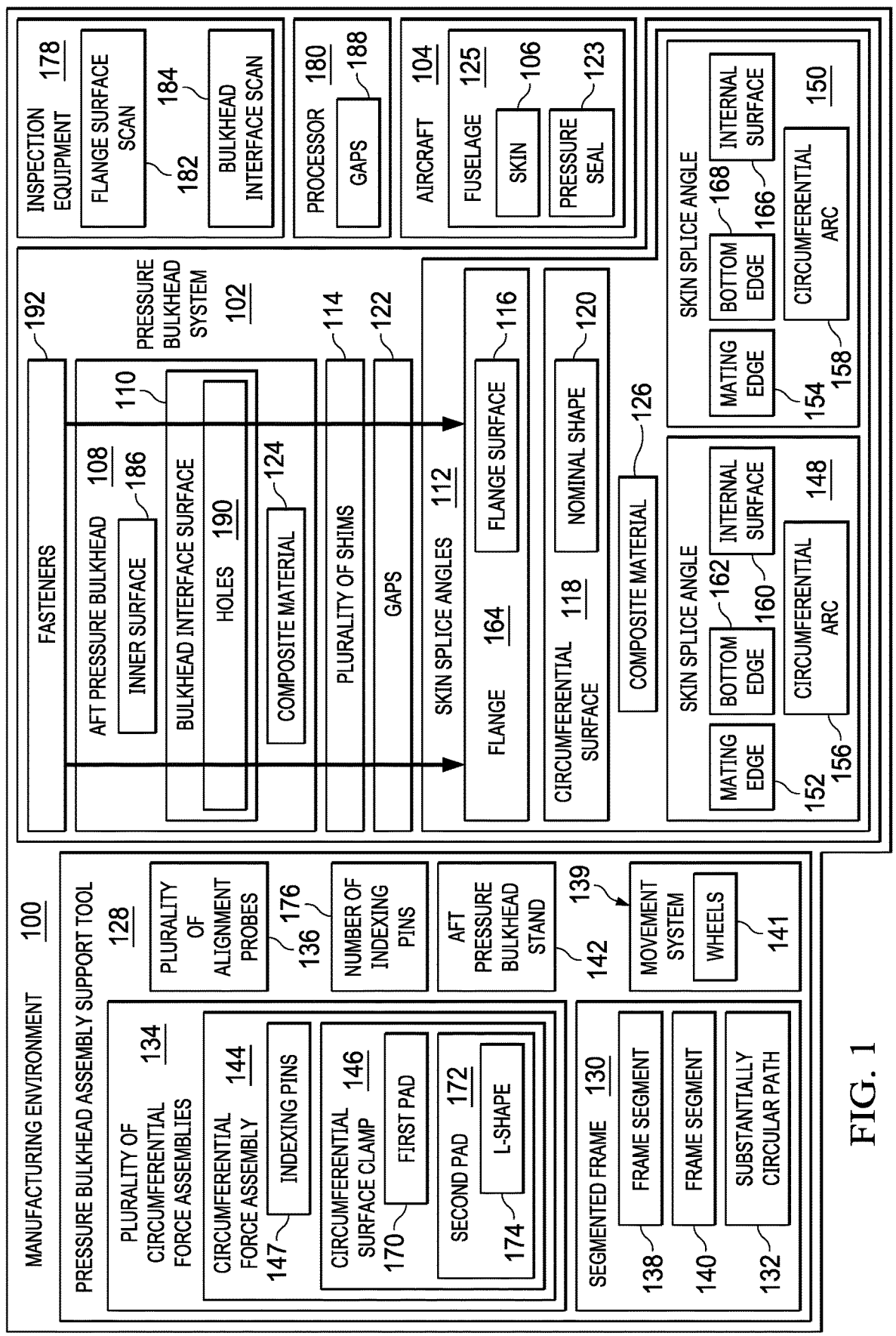
FIG. 1 is an illustration of a block diagram of a manufacturing environment in which an illustrative embodiment may be implemented.

Turning now to FIG. 1, an illustration of a block diagram of a manufacturing environment is depicted in which an illustrative embodiment may be implemented. Manufacturing environment 100 is an environment in which pressure bulkhead system 102 is manufactured. Pressure bulkhead system 102 is configured to be installed in aircraft 104 without an undesirable amount of shims between pressure bulkhead system 102 and skin 106. Pressure bulkhead system 102 is configured to be installed in aircraft 104 with fewer shims between pressure bulkhead system 102 and skin 106 than a conventional bulkhead assembly.

Pressure bulkhead system 102 comprises aft pressure bulkhead 108 having bulkhead interface surface 110, skin splice angles 112 positioned adjacent to one another and joined to aft pressure bulkhead 108, and plurality of shims 114 between flange surface 116 and bulkhead interface surface 110 of aft pressure bulkhead 108. Skin splice angles 112 form circumferential surface 118 and flange surface 116. Circumferential surface 118 has nominal shape 120. Plurality of shims 114 fill gaps 122 between bulkhead interface surface 110 and flange surface 116 when circumferential surface 118 has nominal shape 120. Skin splice angles 112 are joined at bulkhead interface surface 110 on a pressurized side of aft pressure bulkhead 108. Skin splice angles 112 are configured to form pressure seal 123 for fuselage 125.

As depicted, aft pressure bulkhead 108 and skin splice angles 112 are comprised of composite material. Aft pressure bulkhead 108 is formed of composite material 124. Skin splice angles 112 are formed of composite material 126. In some illustrative examples, composite material 124 is the same as composite material 126. In other illustrative examples, composite material 124 is different from composite material 126.

Pressure bulkhead assembly support tool 128 is used to form pressure bulkhead system 102. Pressure bulkhead assembly support tool 128 restrains skin splice angles 112 such that circumferential surface 118 has nominal shape 120. Pressure bulkhead assembly support tool 128 holds aft pressure bulkhead 108 as aft pressure bulkhead 108 is joined to skin splice angles 112.

Pressure bulkhead assembly support tool 128 comprises segmented frame 130 having substantially circular path 132, plurality of circumferential force assemblies 134 positioned along substantially circular path 132 and configured to restrain skin splice angles 112 of pressure bulkhead system 102 such that circumferential surface 118 with nominal shape 120 is formed, and plurality of alignment probes 136 positioned along substantially circular path 132 and configured to hold aft pressure bulkhead 108 having bulkhead interface surface 110.

To form pressure bulkhead system 102, skin splice angles 112 are restrained such that circumferential surface 118 has nominal shape 120. Restraining skin splice angles 112 adjacent to one another in pressure bulkhead assembly support tool 128 such that skin splice angles 112 form circumferential surface 118 with nominal shape 120 comprises sequentially indexing each skin splice angle using indexing pins of pressure bulkhead assembly support tool 128. The indexing pins are components of plurality of circumferential force assemblies 134.

Segmented frame 130 can be separated into multiple frame segments, such as frame segment 138 and frame segment 140. In some illustrative examples, segmented frame 130 is separated to ease in transportation of segmented frame 130. Segmented frame 130 is associated with movement system 139. Movement system 139 is used to move segmented frame 130 to a desired location in manufacturing environment 100. As depicted, movement system 139 includes wheels 141.

In some illustrative examples, segmented frame 130 is separated into multiple frame segments to place aft pressure bulkhead stand 142 in the center of substantially circular path 132. In these illustrative examples, frame segment 138 and frame segment 140 move within manufacturing environment 100 using movement system 139.

Each circumferential force assembly of plurality of circumferential force assemblies 134 comprises a circumferential surface clamp configured to apply pressure to mating edges of skin splice angles of a pressure bulkhead system and indexing pins configured to position the mating edges of two adjacent skin splice angles. As depicted, circumferential force assembly 144 is one of plurality of circumferential force assemblies 134.

Circumferential force assembly 144 comprises circumferential surface clamp 146 configured to apply clamping pressure to mating edges of skin splice angles of pressure bulkhead system 102 and indexing pins 147 configured to position the mating edges of two adjacent skin splice angles. Restraining skin splice angles 112 adjacent to one another in pressure bulkhead assembly support tool 128 such that skin splice angles 112 form circumferential surface 118 with nominal shape 120 comprises applying clamping pressure to mating edges of each skin splice angle to place circumferential surface 118 into nominal shape 120.

For example, skin splice angles 112 includes skin splice angle 148 and skin splice angle 150. Skin splice angle 148 has mating edge 152 contacting mating edge 154 of skin splice angle 150. Skin splice angle 148 has circumferential arc 156. Circumferential arc 156 is a portion of circumferential surface 118. Skin splice angle 150 has circumferential arc 158. Circumferential arc 158 is a portion of circumferential surface 118.

Skin splice angle 148 has internal surface 160. Internal surface 160 is opposite circumferential arc 156. Mating edge 152 spans between circumferential arc 156 and internal surface 160. Bottom edge 162 spans between circumferential arc 156 and internal surface 160. Although bottom edge 162 is referred to as "bottom" because of the orientation of skin splice angle 148 on pressure bulkhead assembly support tool 128, bottom edge 162 will instead be a forward edge of skin splice angle 148 in the orientation of aircraft 104.

In some illustrative examples, bottom edge 162 is perpendicular to mating edge 152. Bottom edge 162 is opposite a portion of skin splice angle 148 forming part of flange 164 of skin splice angles 112. When flange 164 is connected to aft pressure bulkhead 108, bottom edge 162 faces away from aft pressure bulkhead 108.

Skin splice angle 150 has internal surface 166. Internal surface 166 is opposite circumferential arc 158. Mating edge 154 spans between circumferential arc 158 and internal surface 166. Bottom edge 168 spans between circumferential arc 158 and internal surface 166. In some illustrative examples, bottom edge 168 is perpendicular to mating edge 154. Bottom edge 168 is opposite a portion of skin splice angle 148 forming part of flange 164 of skin splice angles 112. When flange 164 is connected to aft pressure bulkhead 108, bottom edge 168 faces away from aft pressure bulkhead 108.

Circumferential surface clamp 146 of circumferential force assembly 144 has first pad 170 configured to contact internal surface of a respective skin splice angle and second pad 172 configured to contact a circumferential arc of a respective skin splice angle. First pad 170 and second pad 172 are formed of any desirable polymeric material configured to hold skin splice angle 148 in place. The material of first pad 170 and second pad 172 is selected to contact the surface of skin splice angle 148 without undesirably affecting the material.

In this illustrative example, circumferential surface clamp 146 of circumferential force assembly 144 has first pad 170 configured to contact internal surface 160 of skin splice angle 148 and second pad 172 configured to contact circumferential arc 156 of skin splice angle 148. Second pad 172 is configured to contact circumferential arc 156 by having a shape configured to contact circumferential arc 156. In some illustrative examples, second pad 172 has L-shape 174. By contacting internal surface 160 and circumferential arc 156 of skin splice angle 148, circumferential surface clamp 146 maintains skin splice angle 148 so that circumferential surface 118 has nominal shape 120.

In some illustrative examples, circumferential surface clamp 146 is configured to contact two adjacent skin splice angles of skin splice angles 112. In some illustrative examples, circumferential surface clamp 146 is configured to contact skin splice angle 148 and skin splice angle 150. In these illustrative examples, circumferential surface clamp 146 contacts skin splice angle 148 and skin splice angle 150 near mating edge 152 and mating edge 154.

Indexing pins 147 are configured to position the mating edges of two adjacent skin splice angles. In this illustrative example, indexing pins 147 are configured to position mating edge 152 of skin splice angle 148 and mating edge 154 of skin splice angle 150. In some illustrative examples, indexing pins 147 include a first indexing pin configured to interface with circumferential arc 156 of skin splice angle 148 and a second indexing pin configured to interface with circumferential arc 158 of skin splice angle 150.

Pressure bulkhead assembly support tool 128 includes number of indexing pins 176 configured to interface with both aft pressure bulkhead 108 and a respective skin splice angle to align and provide an optional consolidation clamp force. Number of indexing pins 176 indexes aft pressure bulkhead 108 relative to pressure bulkhead assembly support tool 128. Number of indexing pins 176 includes any desirable quantity of indexing pins. As used herein a "number of" items means one or more items. For example, number of indexing pins 176 includes one or more indexing pins.

In some illustrative examples, number of indexing pins 176 indexes the skin splice angles of skin splice angles 112 initially placed onto pressure bulkhead assembly support tool 128. The initially placed skin splice angles are the skin splice angles positioned onto pressure bulkhead assembly support tool 128 before the remaining skin splice angles are sequentially placed. The initially placed skin splice angles are indexed to pressure bulkhead assembly support tool 128. Subsequently placed skin splice angles are positioned relative to the initially placed skin splice angles.

For example, when number of indexing pins 176 has two indexing pins, the initially placed skin splice angles comprises two initial skin splice angles. Additional skin splice angles are positioned adjacent to the skin splice angle already restrained on pressure bulkhead assembly support tool 128.

In some illustrative examples, skin splice angle 148 is one of the initially placed skin splice angles of skin splice angles 112. In these illustrative examples, one of number of indexing pins 176 indexes skin splice angle 148 to pressure bulkhead assembly support tool 128. After indexing skin splice angle 148 using number of indexing pins 176 and restraining skin splice angle 148 using two circumferential force assemblies of plurality of circumferential force assemblies 134, a subsequent skin splice angle is positioned adjacent to skin splice angle 148. In some illustrative examples, skin splice angle 150 is the subsequent skin splice angle. In some illustrative examples, skin splice angle 150 is positioned adjacent skin splice angle 148 after indexing and restraining skin splice angle 148.

Skin splice angles 112 are restrained adjacent to one another in pressure bulkhead assembly support tool 128 such that skin splice angles 112 form circumferential surface 118 with nominal shape 120. Restraining skin splice angles 112 also forms flange 164 having flange surface 116. Flange 164 will be joined to aft pressure bulkhead 108 such that flange surface 116 faces bulkhead interface surface 110. Maintaining circumferential surface 118 in nominal shape 120 may create gaps 122 between flange surface 116 and bulkhead interface surface 110. Gaps 122 may be formed due to manufacturing tolerances for skin splice angles 112 and aft pressure bulkhead 108.

Gaps 122 may be estimated prior to assembling pressure bulkhead system 102. Gaps 122 may be estimated using inspection equipment 178 and processor 180.

Flange surface 116 of flange 164 formed by skin splice angles 112 restrained adjacent to one another in pressure bulkhead assembly support tool 128 is scanned to form flange surface scan 182. Flange surface scan 182 is used to estimate gaps 122.

Aft pressure bulkhead 108 having bulkhead interface surface 110 is aligned on pressure bulkhead assembly support tool 128. Bulkhead interface surface 110 is located radially along the circumference of aft pressure bulkhead 108. Bulkhead interface surface 110 of aft pressure bulkhead 108 is scanned to form bulkhead interface scan 184. Bulkhead interface scan 184 is used to estimate gaps 122.

Aft pressure bulkhead 108 is placed onto pressure bulkhead assembly support tool 128 using any desirable method. In some illustrative examples, aft pressure bulkhead 108 is lifted and placed using a vacuum system. In some illustrative examples, aft pressure bulkhead 108 is lifted and placed mechanically by connecting a lift to temporary fasteners extending through aft pressure bulkhead 108. The temporary fasteners take any desirable form. In some illustrative examples, the temporary fasteners are temporary hoist rings. The temporary fasteners are installed through aft pressure bulkhead 108. Aft pressure bulkhead 108 is lifted by the temporary fasteners prior to aligning aft pressure bulkhead 108.

When aft pressure bulkhead 108 is placed on pressure bulkhead assembly support tool 128, aft pressure bulkhead stand 142 is positioned within substantially circular path 132 and configured to contact inner surface 186 of aft pressure bulkhead 108. Aft pressure bulkhead 108 is indexed to pressure bulkhead assembly support tool 128 using number of indexing pins 176. Aft pressure bulkhead 108 is aligned and held by plurality of alignment probes 136 and aft pressure bulkhead stand 142.

In some illustrative examples, aft pressure bulkhead 108 is placed onto pressure bulkhead assembly support tool 128 when skin splice angles 112 are not on pressure bulkhead assembly support tool 128. In some illustrative examples, aft pressure bulkhead 108 is placed onto pressure bulkhead assembly support tool 128 when skin splice angles 112 are present on pressure bulkhead assembly support tool 128. If aft pressure bulkhead 108 is placed onto pressure bulkhead assembly support tool 128 when skin splice angles 112 are present, skin splice angles 112 may provide additional support to aft pressure bulkhead 108.

In some illustrative examples, aft pressure bulkhead 108 is aligned on pressure bulkhead assembly support tool 128 while skin splice angles 112 are adjacent to one another in pressure bulkhead assembly support tool 128. In some of these illustrative examples, skin splice angles 112 are removed from pressure bulkhead assembly support tool 128 prior to scanning bulkhead interface surface 110 of aft pressure bulkhead 108.

Gaps 188 between the bulkhead interface scan and the flange surface scan are determined. Gaps 188 are representative of gaps 122 between flange surface 116 and bulkhead interface surface 110. Plurality of shims 114 are manufactured to fill gaps 188. As gaps 188 are representative of gaps 122, plurality of shims 114 will fill gaps 122.

Plurality of shims 114 are formed of any desirable shimming material. In some illustrative examples, plurality of shims 114 is formed of composite material. In some illustrative examples, plurality of shims 114 is formed of a fiberglass material or carbon fiber material.

Aft pressure bulkhead 108 and flange 164 formed by skin splice angles 112 are joined while plurality of shims 114 configured to fill gaps 188 is positioned between flange surface 116 and bulkhead interface surface 110. In some illustrative examples, after plurality of shims 114 is manufactured and prior to joining skin splice angles 112 to aft pressure bulkhead 108, plurality of shims 114 is attached to flange surface 116. In some illustrative examples, plurality of shims 114 is attached to bulkhead interface surface 110 prior to joining aft pressure bulkhead 108 and skin splice angles 112.

Plurality of shims 114 is attached to aft pressure bulkhead 108 or flange surface 116 in any desirable fashion. In some illustrative examples, plurality of shims 114 is temporarily fastened to flange surface 116 of skin splice angles 112 prior to joining skin splice angles 112 and aft pressure bulkhead 108. In these illustrative examples, plurality of shims 114 are attached to flange surface 116 using any desirable type of temporary fasteners.

After attaching plurality of shims 114 to one of flange surface 116 of skin splice angles 112 or aft pressure bulkhead 108, aft pressure bulkhead 108 is lowered onto skin splice angles 112 restrained adjacent to one another in pressure bulkhead assembly support tool 128.

Aft pressure bulkhead 108 and flange 164 formed by skin splice angles 112 are joined. Aft pressure bulkhead 108 and flange 164 formed by skin splice angles 112 are joined while skin splice angles 112 are restrained adjacent to one another in pressure bulkhead assembly support tool 128 to form pressure bulkhead system 102.

To join aft pressure bulkhead 108 to skin splice angles 112, holes 190 are drilled through aft pressure bulkhead 108 and skin splice angles 112. More specifically, holes 190 are drilled through bulkhead interface surface 110 and flange 164 of skin splice angles 112.

After drilling holes 190 into aft pressure bulkhead 108 and skin splice angles 112, fasteners 192 are sent through holes 190. Fasteners 192 take any desirable form. Fasteners 192 extending through holes 190 join aft pressure bulkhead 108 to skin splice angles 112 to form pressure bulkhead system 102. Fasteners 192 are permanent fasteners. In these illustrative examples, joining aft pressure bulkhead 108 and flange 164 comprises drilling holes 190 through bulkhead interface surface 110 of aft pressure bulkhead 108 and applying the permanent fasteners, fasteners 192, through holes 190.

Pressure bulkhead system 102 is removed from pressure bulkhead assembly support tool 128. Pressure bulkhead system 102 is then installed into Skin splice angles 112 are joined to a skin 106 of fuselage 125.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary.

For example, second pad 172 may not have L-shape 174. In some illustrative examples, second pad 172 may be configured to only contact circumferential surfaces. In some illustrative examples, circumferential force assembly 144 applies a clamping force to only a single skin splice angle. For example, circumferential force assembly 144 may apply pressure to circumferential arc 156 in a location away from mating edge 152. In these illustrative examples, circumferential force assembly 144 does not apply pressure to skin splice angle 150.

Figure 2:
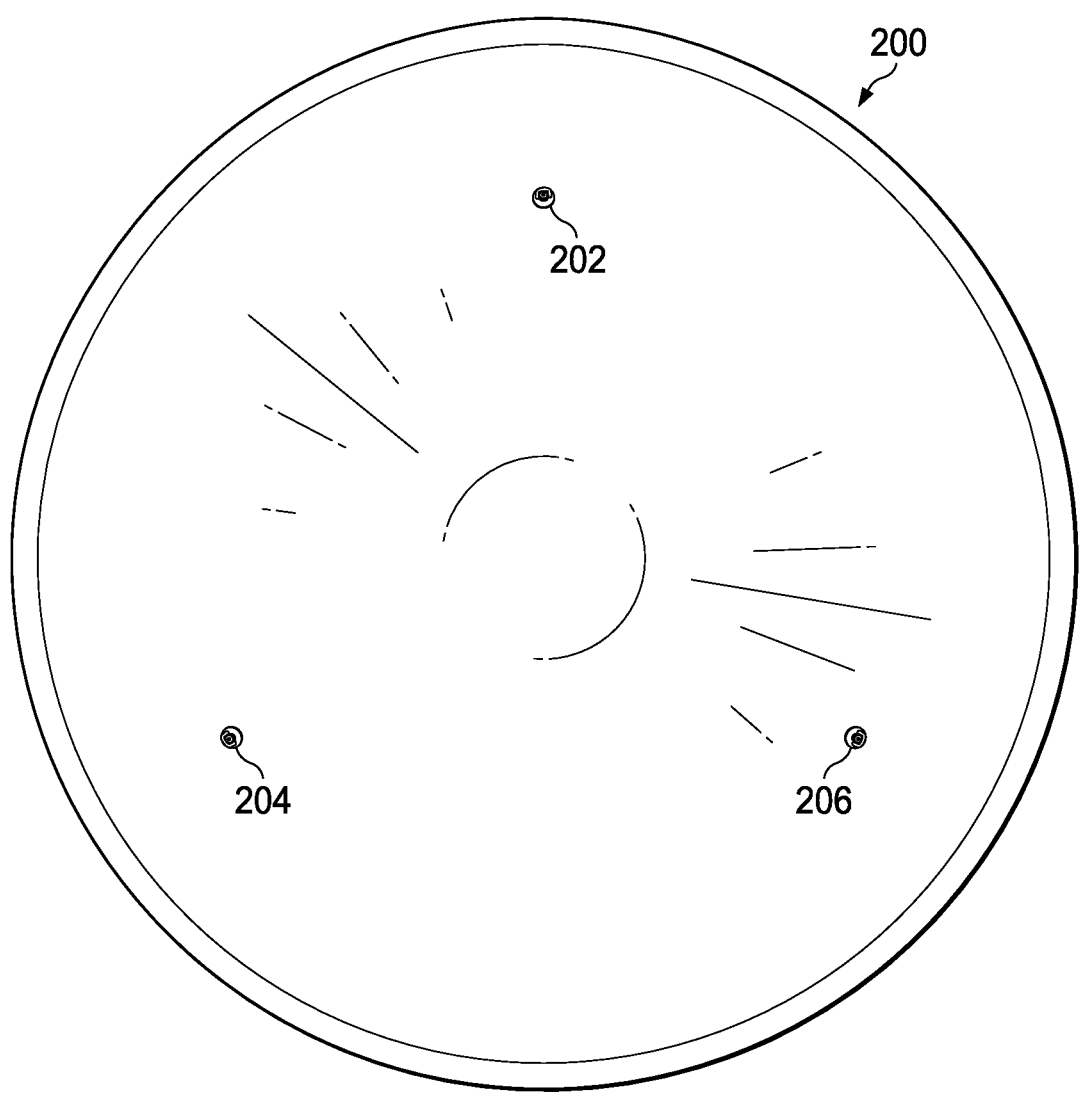
FIG. 2 is an illustration of a top view of an aft pressure bulkhead in accordance with an illustrative embodiment.

Turning now to FIG. 2, an illustration of a top view of an aft pressure bulkhead is depicted in accordance with an illustrative embodiment. Aft pressure bulkhead 200 is a physical implementation of aft pressure bulkhead 108 of FIG. 1. Aft pressure bulkhead 200 is formed of a composite material. Aft pressure bulkhead 200 has lift location 202, lift location 204, and lift location 206. Temporary fasteners (not depicted), such as hoist rings, may be positioned in lift location 202, lift location 204, and lift location 206. Temporary fasteners in lift location 202, lift location 204, and lift location 206 may be used to lift and position aft pressure bulkhead 200.

Figure 3:
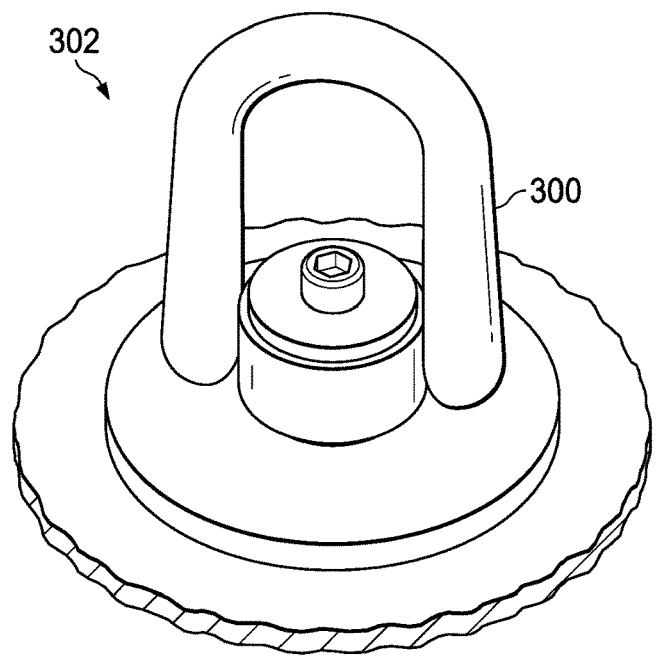
FIG. 3 is an illustration of a top isometric view of a temporary fastener for lifting an aft pressure bulkhead in accordance with an illustrative embodiment.

Turning now to FIG. 3, an illustration of a top isometric view of a temporary fastener for lifting an aft pressure bulkhead is depicted in accordance with an illustrative embodiment. Temporary fastener 300 is configured to be placed into one of lift location 202, lift location 204, or lift location 206 to lift an aft pressure bulkhead, such as aft pressure bulkhead 200 of FIG. 2. As depicted, temporary fastener 300 takes the form of a temporary hoist ring. As depicted, temporary fastener 300 is a D-ring. View 302 is a view of a first half of temporary fastener 300 on a first side of an aft pressure bulkhead. View 302 may be a view of top surface of aft pressure bulkhead 200 as depicted in FIG. 2.

Figure 4:
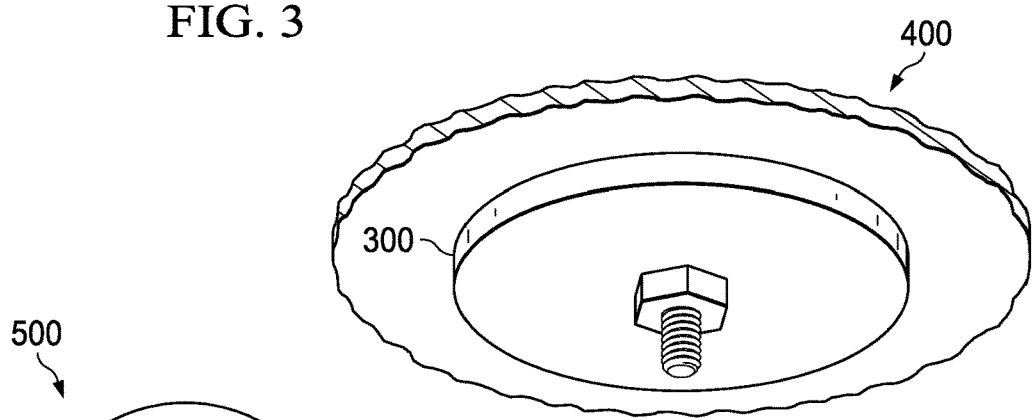
FIG. 4 is an illustration of a bottom isometric view of a temporary fastener for lifting an aft pressure bulkhead in accordance with an illustrative embodiment.

Turning now to FIG. 4, an illustration of a bottom isometric view of a temporary fastener for lifting an aft pressure bulkhead is depicted in accordance with an illustrative embodiment. View 400 is a back view of temporary fastener 300 of FIG. 3. View 400 is a view of a second half of temporary fastener 300 on an inner surface of an aft pressure bulkhead, such as aft pressure bulkhead 200 of FIG. 2.

Figure 5:
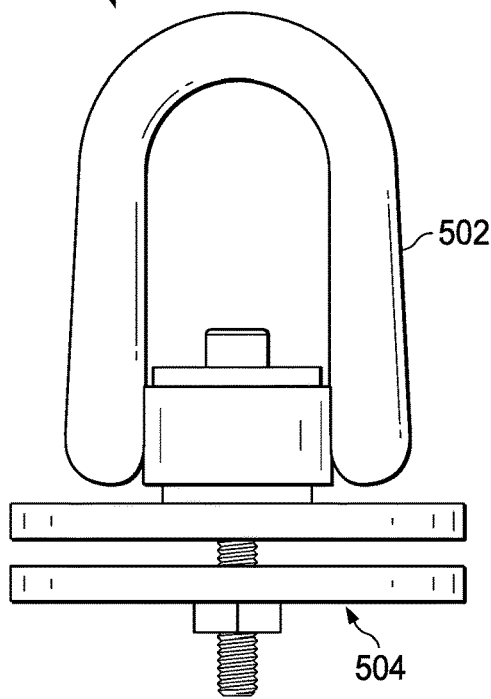
FIG. 5 is an illustration of a side view of a temporary fastener for lifting an aft pressure bulkhead in accordance with an illustrative embodiment.

Turning now to FIG. 5, an illustration of a side view of a temporary fastener for lifting an aft pressure bulkhead is depicted in accordance with an illustrative embodiment. Temporary fastener 500 is a physical implementation of a temporary fastener used to lift aft pressure bulkhead 108 of FIG. 1. In some illustrative examples, temporary fastener 500 is the same as temporary fastener 300 of FIGS. 3 and 4. As depicted, temporary fastener 500 takes the form of a temporary hoist ring. Temporary fastener 500 includes first half 502 and second half 504. When installed in an aft pressure bulkhead, first half 502 is visible in a top view of the aft pressure bulkhead. The top view is a view of the convex surface. When installed in an aft pressure bulkhead, second half 504 is visible in a bottom view of the aft pressure bulkhead. The bottom view is a view of the concave surface.

Figure 6:
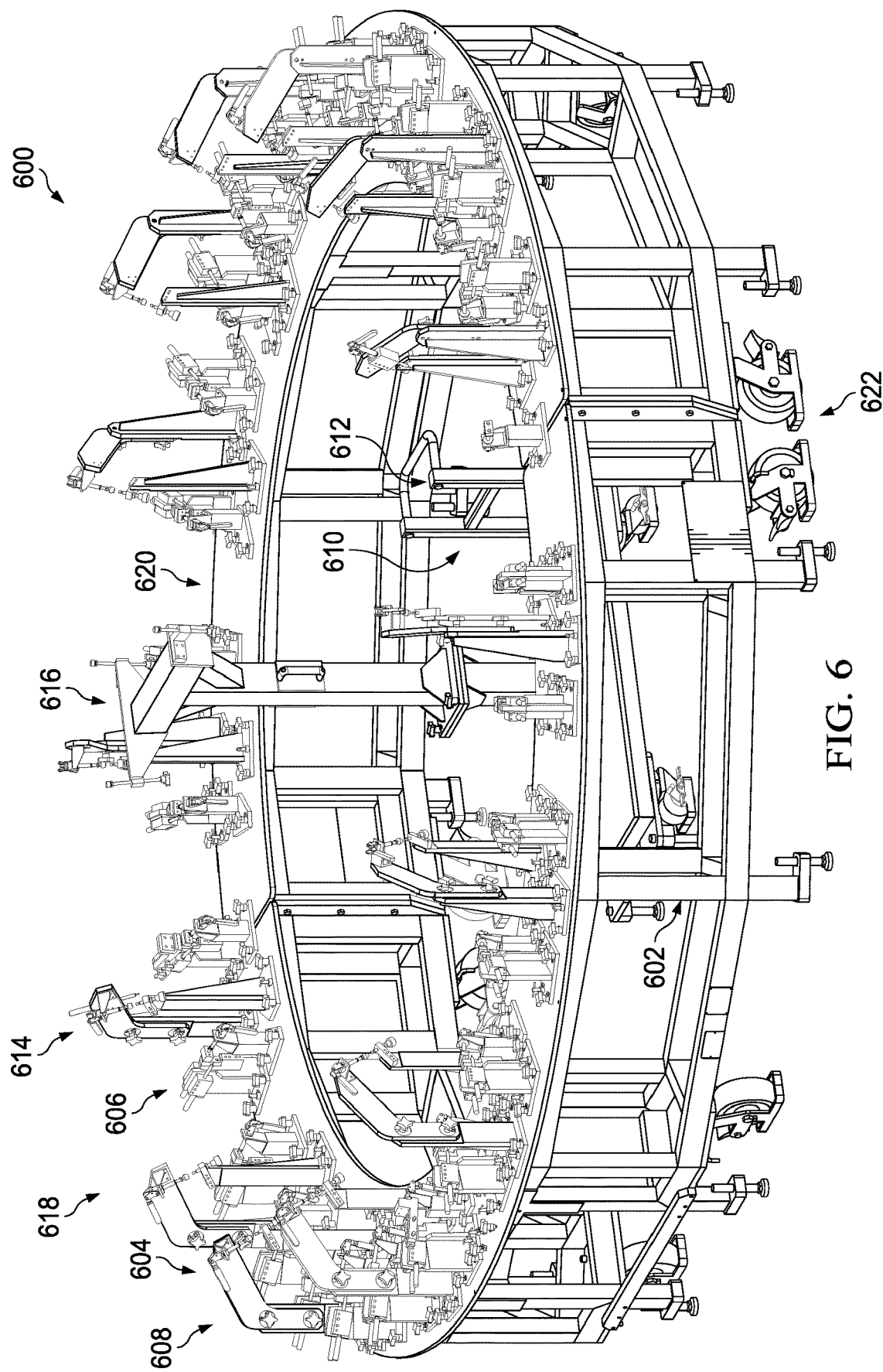
FIG. 6 is an illustration of an isometric view of a pressure bulkhead assembly support tool in accordance with an illustrative embodiment.

Turning now to FIG. 6, an illustration of an isometric view of a pressure bulkhead assembly support tool is depicted in accordance with an illustrative embodiment. Pressure bulkhead assembly support tool 600 is a physical implementation of pressure bulkhead assembly support tool 128 of FIG. 1. Pressure bulkhead assembly support tool 600 may be used to position and assemble a pressure bulkhead system, such as pressure bulkhead system 102 of FIG. 1. Pressure bulkhead assembly support tool 600 may be used to position and join skin splice angles to aft pressure bulkhead 200 of FIG. 2.

Pressure bulkhead assembly support tool 600 includes segmented frame 602 having substantially circular path 604, plurality of circumferential force assemblies 606 positioned along substantially circular path 604, and plurality of alignment probes 608 positioned along substantially circular path 604. Plurality of circumferential force assemblies 606 is configured to restrain skin splice angles of a pressure bulkhead system such that a circumferential surface with a nominal shape is formed. Plurality of alignment probes 608 is positioned along substantially circular path 604 and configured to hold an aft pressure bulkhead having a bulkhead interface surface.

Each circumferential force assembly of plurality of circumferential force assemblies 606 comprises a circumferential surface clamp configured to apply pressure to mating edges of skin splice angles of a pressure bulkhead system and indexing pins configured to position the mating edges of two adjacent skin splice angles. The circumferential surface clamp of each circumferential force assembly has a first pad configured to contact an internal surface of a respective skin splice angle and a second pad configured to contact a circumferential arc of a respective skin splice angle.

Pressure bulkhead assembly support tool 600 also has number of indexing pins 610 configured to interface with both the aft pressure bulkhead and a respective skin splice angle to align and provide an optional consolidation clamp force. As depicted, number of indexing pins 610 includes indexing pin 612 and indexing pin 614. Although number of indexing pins 610 includes two indexing pins, in other illustrative examples, number of indexing pins 610 comprises any desirable quantity of indexing pins.

Pressure bulkhead assembly support tool 600 also includes aft pressure bulkhead stand 616 positioned within substantially circular path 604 and configured to contact an inner surface of an aft pressure bulkhead. When an aft pressure bulkhead is positioned on pressure bulkhead assembly support tool 600, aft pressure bulkhead stand 616 supports the aft pressure bulkhead and plurality of alignment probes 608 positioned along substantially circular path 604 align the aft pressure bulkhead.

Segmented frame 602 can be separated into multiple frame segments, such as frame segment 618 and frame segment 620. In some illustrative examples, segmented frame 602 is separated to ease in transportation of segmented frame 602. In some illustrative examples, segmented frame 602 is separated into multiple frame segments to place aft pressure bulkhead stand 616 in the center of substantially circular path 604.

Pressure bulkhead assembly support tool 600 also has movement system 622. As depicted, movement system 622 takes the form of wheel assemblies.

Figure 7:
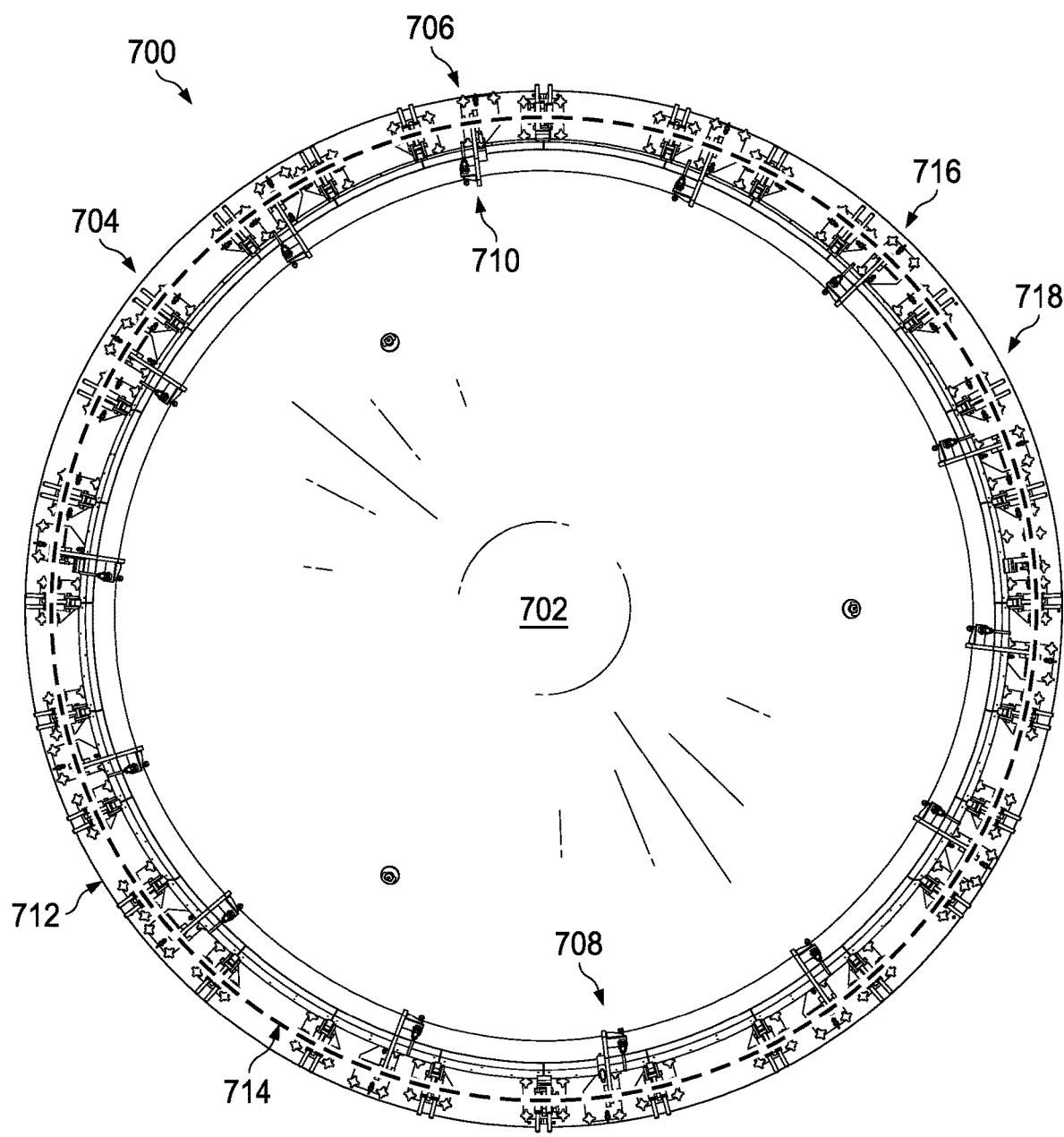
FIG. 7 is an illustration of a top view of an aft pressure bulkhead on a pressure bulkhead assembly support tool in accordance with an illustrative embodiment.

Turning now to FIG. 7, an illustration of a top view of an aft pressure bulkhead on a pressure bulkhead assembly support tool is depicted in accordance with an illustrative embodiment. View 700 is a top view of aft pressure bulkhead 702 on pressure bulkhead assembly support tool 704. Aft pressure bulkhead 702 is a physical implementation of aft pressure bulkhead 108 of FIG. 1. In some illustrative examples, aft pressure bulkhead 702 is the same as aft pressure bulkhead 200 of FIG. 2. Pressure bulkhead assembly support tool 704 is a physical implementation of pressure bulkhead assembly support tool 128 of FIG. 1. In some illustrative examples, pressure bulkhead assembly support tool 704 is the same as pressure bulkhead assembly support tool 600 of FIG. 6.

In view 700, aft pressure bulkhead 702 is indexed to pressure bulkhead assembly support tool 704 by number of indexing pins 706 configured to interface with both aft pressure bulkhead 702 and a respective skin splice angle. Number of indexing pins 706 includes indexing pin 708 and indexing pin 710.

Aft pressure bulkhead 702 is indexed to segmented frame 712 of pressure bulkhead assembly support tool 704 having substantially circular path 714. Plurality of alignment probes 716 positioned along substantially circular path 714 holds aft pressure bulkhead 702. Plurality of alignment probes 716 align aft pressure bulkhead 702 relative to segmented frame 712.

Pressure bulkhead assembly support tool 704 also has plurality of circumferential force assemblies 718 positioned along substantially circular path 714. Plurality of circumferential force assemblies 718 is configured to restrain skin splice angles of a pressure bulkhead system such that a circumferential surface with a nominal shape is formed.

Figure 8:
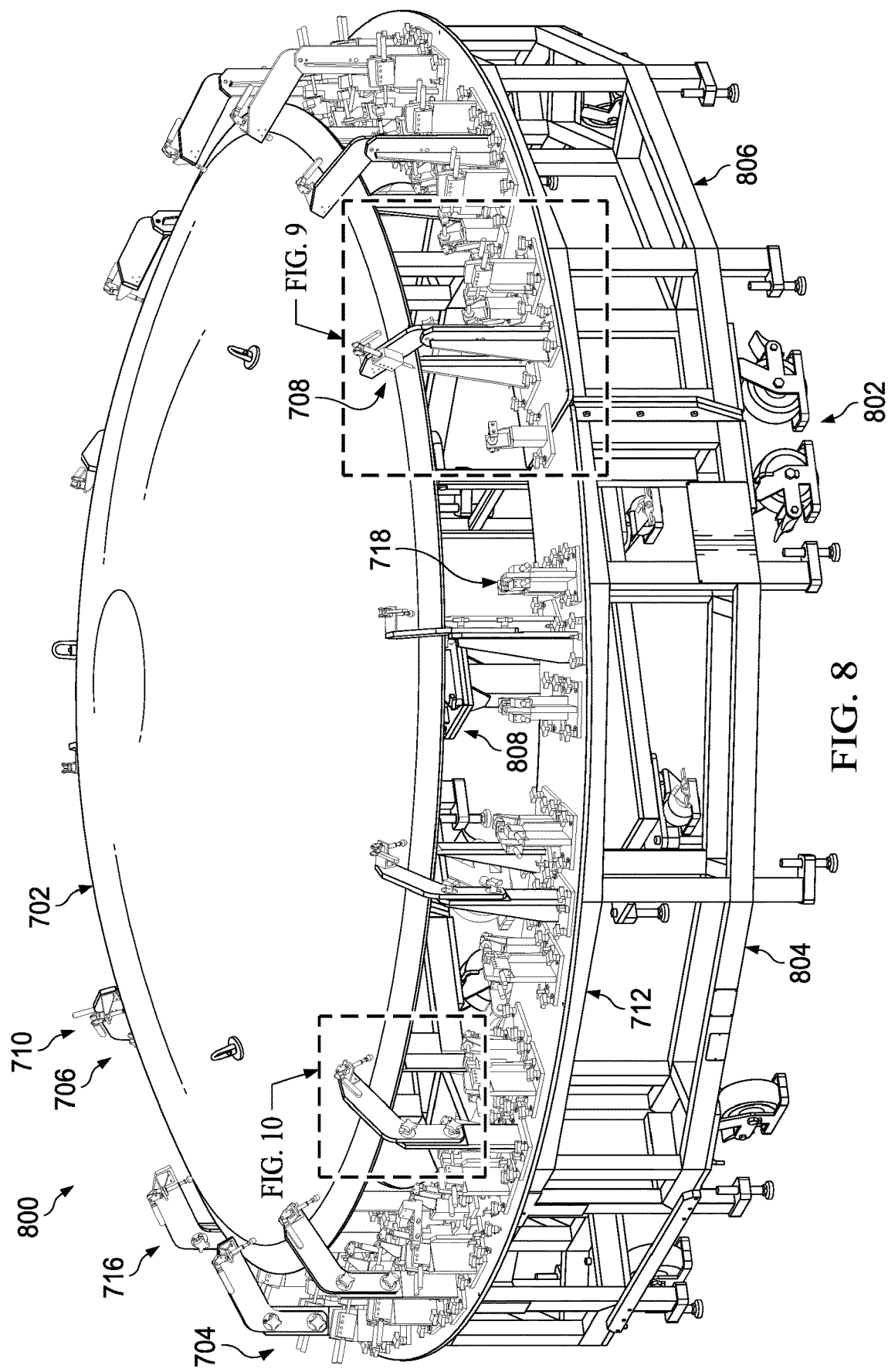
FIG. 8 is an illustration of an isometric view of an aft pressure bulkhead on a pressure bulkhead assembly support tool in accordance with an illustrative embodiment.

Turning now to FIG. 8, an illustration of an isometric view of an aft pressure bulkhead on a pressure bulkhead assembly support tool is depicted in accordance with an illustrative embodiment. View 800 is an isometric view of aft pressure bulkhead 702 on pressure bulkhead assembly support tool 704 of FIG. 7.

As can be seen in view 800, pressure bulkhead assembly support tool 704 has segmented frame 712 on movement system 802. Segmented frame 712 includes segment 804 and segment 806. Segment 804 and segment 806 can be separated for each of transportation of pressure bulkhead assembly support tool 704. Segment 804 and segment 806 can be separated for placing aft pressure bulkhead stand 808 within substantially circular path 714.

In view 800, aft pressure bulkhead stand 808 is positioned within substantially circular path 714. Aft pressure bulkhead stand 808 is configured to contact an inner surface of aft pressure bulkhead 702. Aft pressure bulkhead stand 808 supports aft pressure bulkhead 702.

Aft pressure bulkhead 702 has a bulkhead interface surface on the inner surface of aft pressure bulkhead 702. Plurality of alignment probes 716 positioned along substantially circular path 714 align aft pressure bulkhead 702 relative to pressure bulkhead assembly support tool 704. The bulkhead interface surface of aft pressure bulkhead 702 is scanned to form a bulkhead interface scan while aft pressure bulkhead 702 is aligned relative to pressure bulkhead assembly support tool 704.

Figure 9:
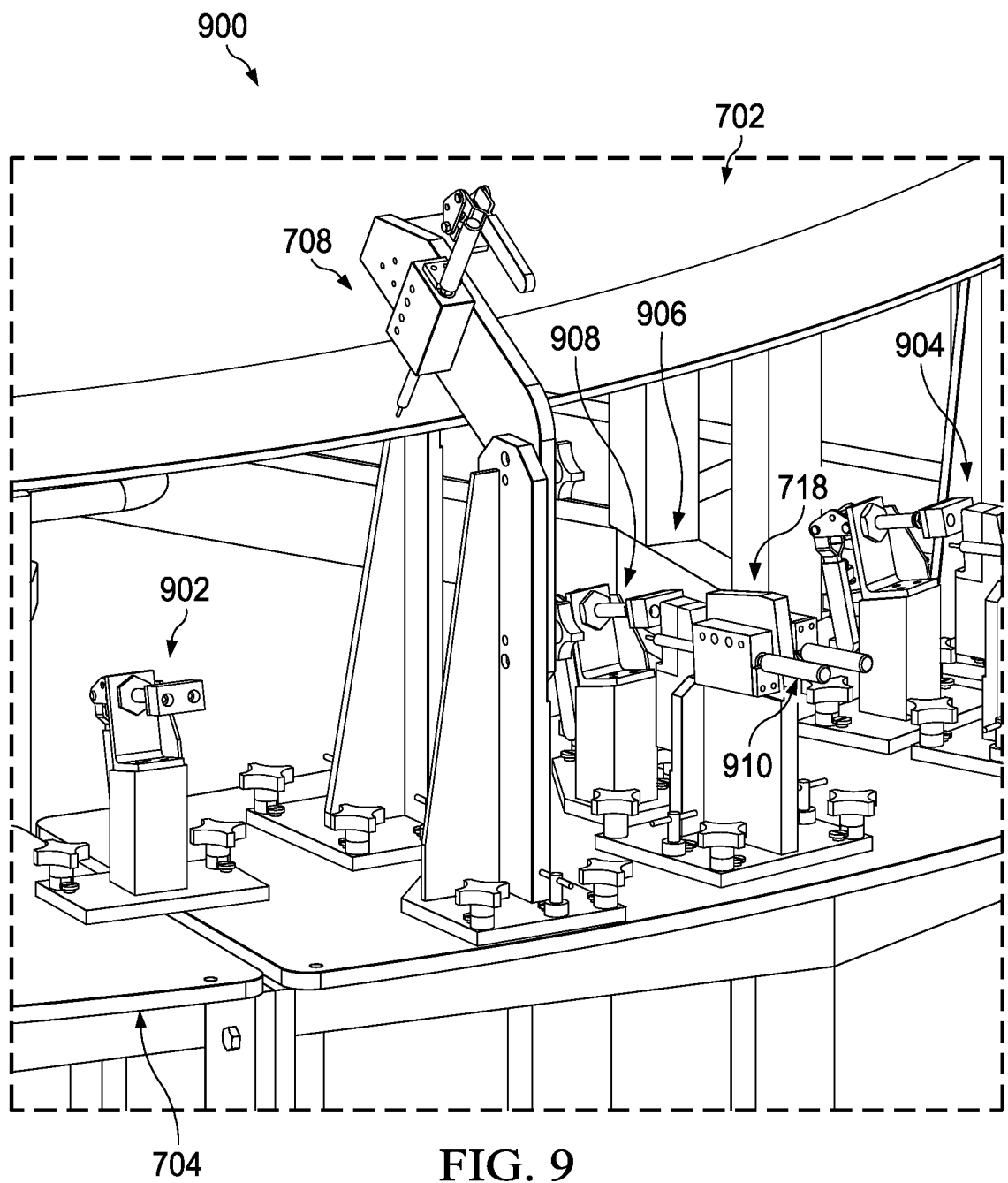
FIG. 9 is an illustration of an isometric view of an indexing pin aligning an aft pressure bulkhead on a pressure bulkhead assembly support tool in accordance with an illustrative embodiment.

Turning now to FIG. 9, an illustration of an isometric view of an indexing pin aligning an aft pressure bulkhead on a pressure bulkhead assembly support tool is depicted in accordance with an illustrative embodiment. View 900 is a view within the box labeled as FIG. 9 within FIG. 8.

View 900 is a closer view of indexing pin 708. As depicted, indexing pin 708 is indexing aft pressure bulkhead 702 to pressure bulkhead assembly support tool 704. In view 900, circumferential force assembly 902, circumferential force assembly 904, and circumferential force assembly 906 of plurality of circumferential force assemblies 718 are visible.

Each circumferential force assembly of plurality of circumferential force assemblies 718 comprises a circumferential surface clamp configured to apply pressure to mating edges of skin splice angles of a pressure bulkhead system and indexing pins configured to position the mating edges of two adjacent skin splice angles. For example, circumferential force assembly 906 has circumferential surface clamp 908 and indexing pins 910.

Figure 10:
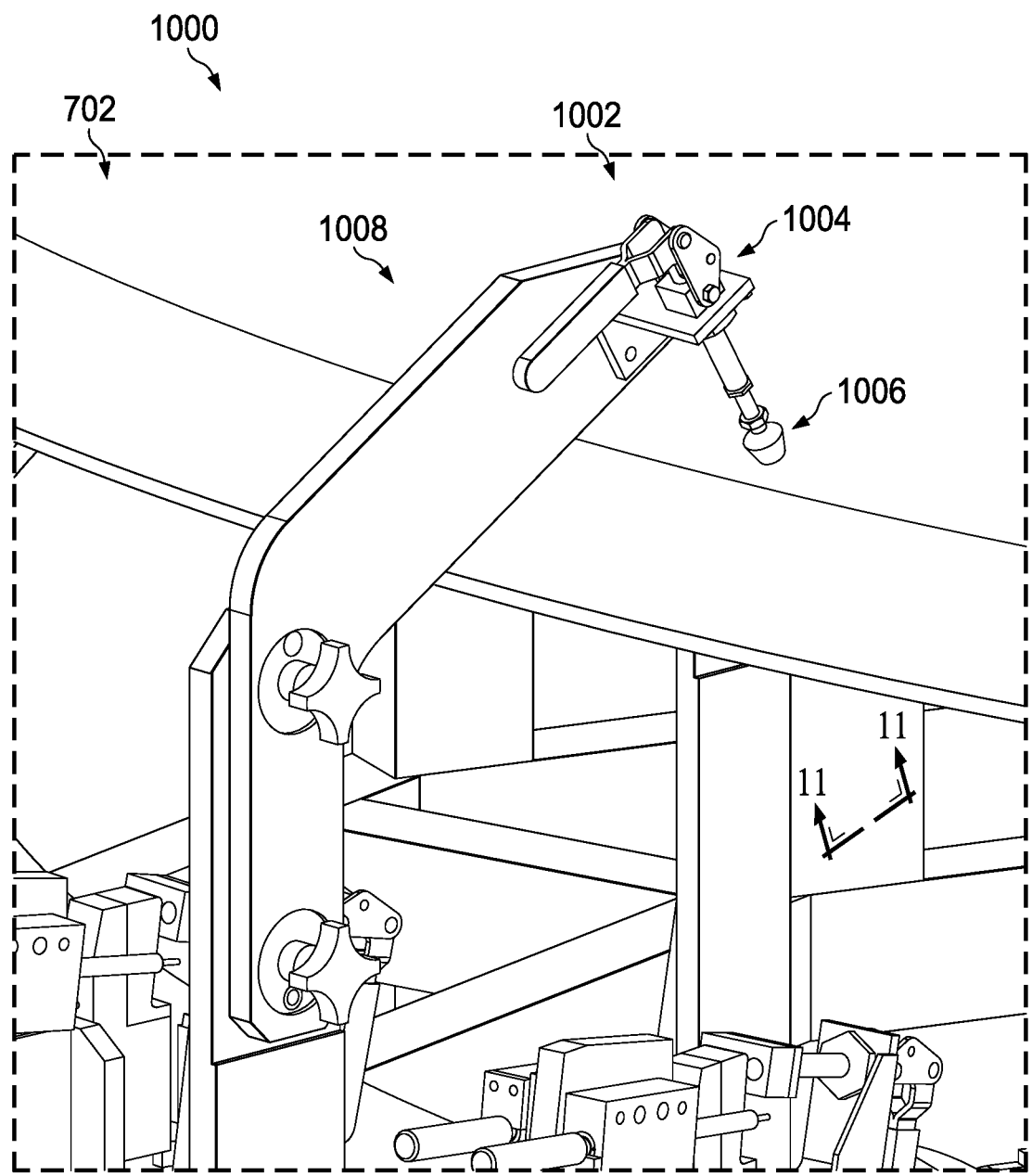
FIG. 10 is an illustration of a top isometric view of an alignment probe aligning an aft pressure bulkhead on a pressure bulkhead assembly support tool in accordance with an illustrative embodiment.

Turning now to FIG. 10, an illustration of a top isometric view of an alignment probe aligning an aft pressure bulkhead on a pressure bulkhead assembly support tool is depicted in accordance with an illustrative embodiment. View 1000 is a view within the box labeled FIG. 10 in FIG. 8. In view 1000 alignment probe 1002 is in contact with aft pressure bulkhead 702. Alignment probe 1002 takes the form of clamp 1004 with probe 1006 in contact with external surface 1008 of aft pressure bulkhead 702.

Figure 11:
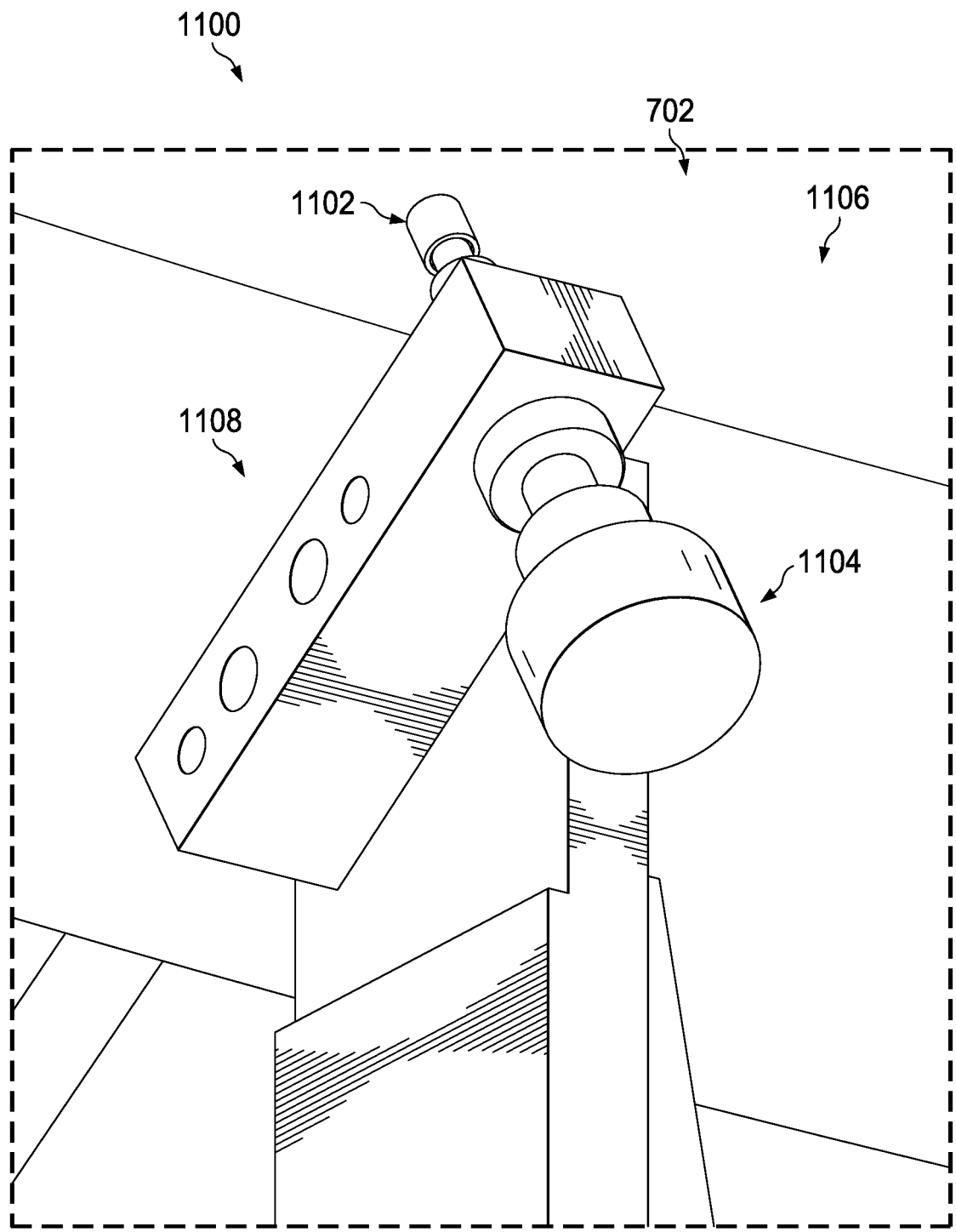
FIG. 11 is an illustration of a bottom isometric view of an alignment probe aligning an aft pressure bulkhead on a pressure bulkhead assembly support tool in accordance with an illustrative embodiment.

Turning now to FIG. 11, an illustration of a bottom isometric view of an alignment probe aligning an aft pressure bulkhead on a pressure bulkhead assembly support tool is depicted in accordance with an illustrative embodiment. View 1100 is a view of the opposite side of aft pressure bulkhead 702 from view 1000 shown in FIG. 10. View 1100 is a view from direction 11 of FIG. 10. In view 1100, probe 1102 connected to hand knob 1104 contacts internal surface 1106 of aft pressure bulkhead 702.

Bulkhead interface surface 1108 of aft pressure bulkhead 702 is visible in view 1100. Prior to assembling a pressure bulkhead system, bulkhead interface surface 1108 is scanned to form a bulkhead interface scan. During assembly of a pressure bulkhead system, a flange formed by skin splice angles will be connected to bulkhead interface surface 1108.

Figure 12:
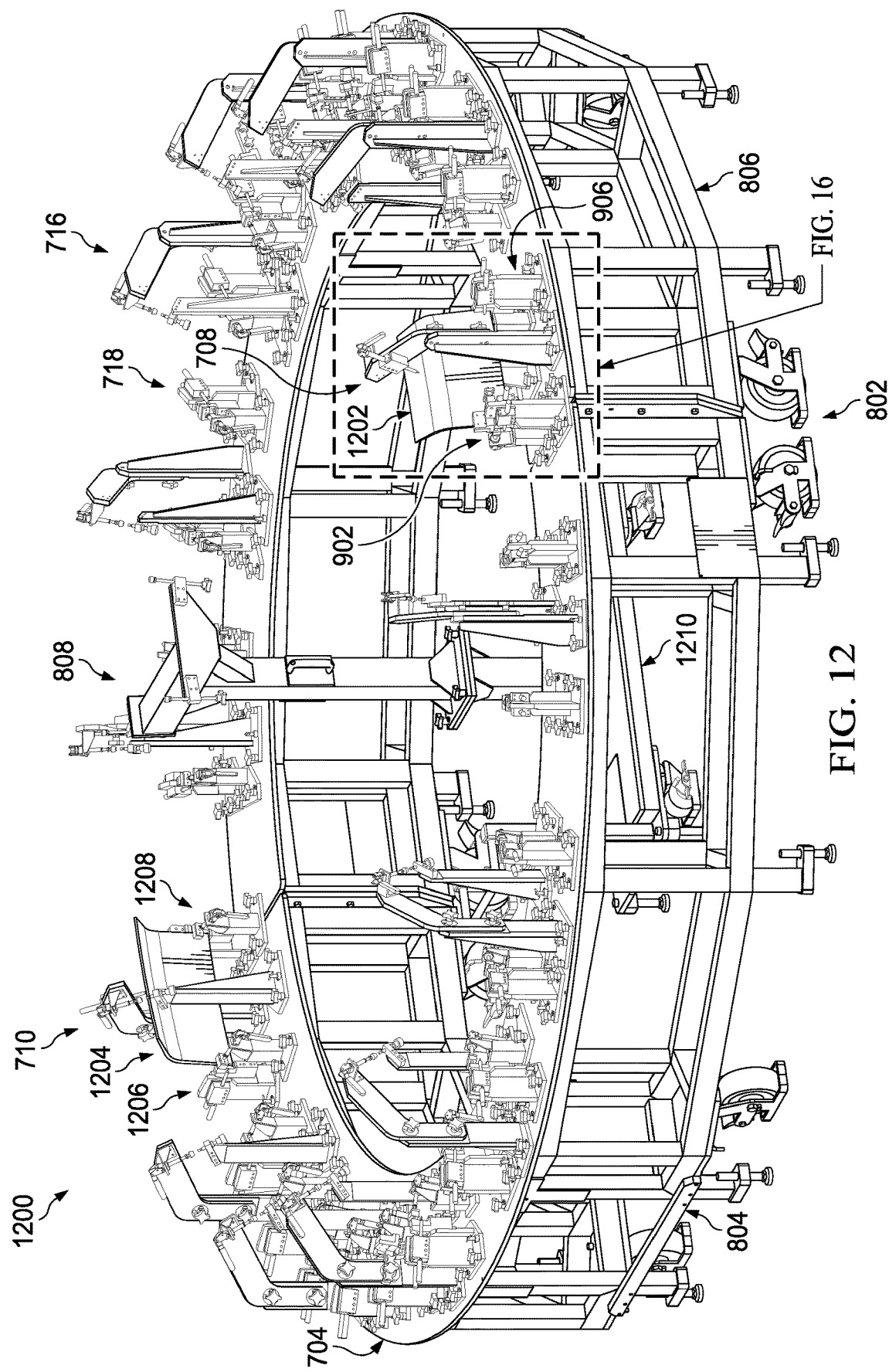
FIG. 12 is an illustration of an isometric view of skin splice angles on a pressure bulkhead assembly support tool in accordance with an illustrative embodiment.

Turning now to FIG. 12, an illustration of an isometric view of skin splice angles on a pressure bulkhead assembly support tool is depicted in accordance with an illustrative embodiment. In view 1200, skin splice angle 1202 and skin splice angle 1204 are restrained by pressure bulkhead assembly support tool 704. Pressure bulkhead assembly support tool 704 is a physical implementation of pressure bulkhead assembly support tool 128 of FIG. 1.

In some illustrative examples, pressure bulkhead assembly support tool 704 is the same as pressure bulkhead assembly support tool 600 of FIG. 6. Pressure bulkhead assembly support tool 704 is used to position and join skin splice angles to an aft pressure bulkhead.

Pressure bulkhead assembly support tool 704 includes segmented frame 712 having substantially circular path 714, plurality of circumferential force assemblies 718 positioned along substantially circular path 714, and plurality of alignment probes 716 positioned along substantially circular path 714. Plurality of circumferential force assemblies 718 is configured to restrain skin splice angles of a pressure bulkhead system such that a circumferential surface with a nominal shape is formed. As depicted, circumferential force assemblies of plurality of circumferential force assemblies 718 restrain skin splice angle 1202 and skin splice angle 1204. As depicted, circumferential force assembly 902 and circumferential force assembly 906 restrain skin splice angle 1202. As depicted, circumferential force assembly 1206 and circumferential force assembly 1208 restrain skin splice angle 1204.

Skin splice angle 1202 and skin splice angle 1204 are the first skin splice angles of a plurality of skin splice angles to be restrained by pressure bulkhead assembly support tool 704. Skin splice angle 1202 and skin splice angle 1204 are initially placed relative to number of indexing pins 706. Skin splice angle 1202 is indexed to pressure bulkhead assembly support tool 704 by indexing pin 708. Skin splice angle 1204 is indexed to pressure bulkhead assembly support tool 704 by indexing pin 710.

Number of indexing pins 706 is configured to interface with both an aft pressure bulkhead and a respective skin splice angle. Indexing pin 708 is configured to interface with skin splice angle 1202 and an aft pressure bulkhead. Indexing pin 710 is configured to interface with skin splice angle 1204 and the aft pressure bulkhead.

Each circumferential force assembly of plurality of circumferential force assemblies 718 comprises a circumferential surface clamp configured to apply pressure to mating edges of skin splice angles of a pressure bulkhead system and indexing pins configured to position the mating edges of two adjacent skin splice angles.

As depicted, aft pressure bulkhead stand 808 configured to contact an inner surface of an aft pressure bulkhead is positioned within substantially circular path 714. Aft pressure bulkhead stand 808 is on movement system 1210. Aft pressure bulkhead stand 808 is moveable relative to pressure bulkhead assembly support tool 704 on movement system 1210.

Figure 13:
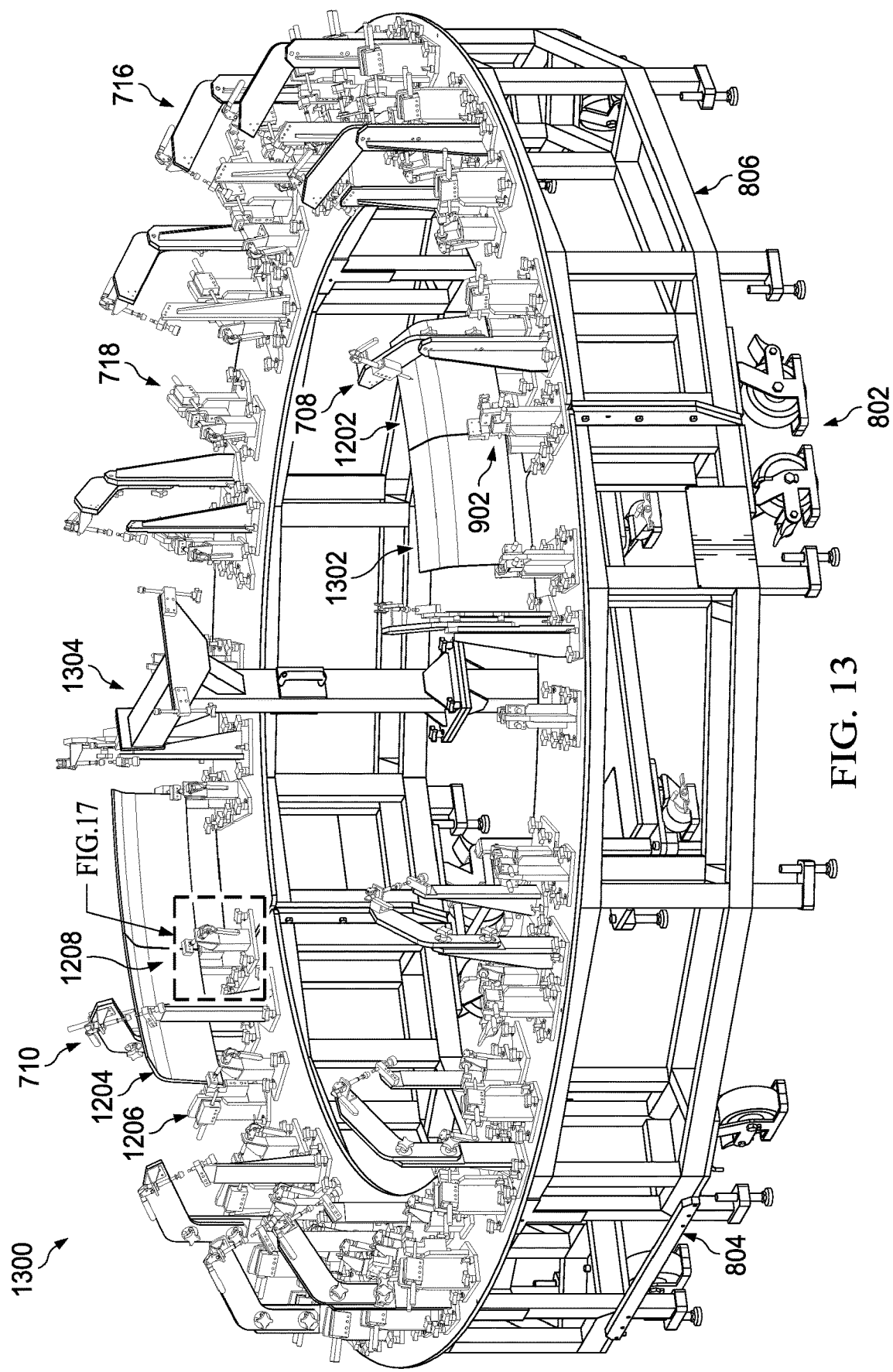
FIG. 13 is an illustration of an isometric view of additional skin splice angles in a pressure bulkhead assembly support tool in accordance with an illustrative embodiment.

Turning now to FIG. 13, an illustration of an isometric view of additional skin splice angles in a pressure bulkhead assembly support tool is depicted in accordance with an illustrative embodiment. In view 1300 skin splice angle 1302 and skin splice angle 1304 are restrained by pressure bulkhead assembly support tool 704. Skin splice angle 1302 is adjacent to and in contact with skin splice angle 1202. Skin splice angle 1304 is adjacent to and in contact with skin splice angle 1204.

The edges of skin splice angle 1304 and skin splice angle 1204 contacting each other are referred to as mating edges. The edges of skin splice angle 1302 and skin splice angle 1202 contacting each other are referred to as mating edges.

Each circumferential force assembly of plurality of circumferential force assemblies 718 comprises a circumferential surface clamp configured to apply pressure to mating edges of skin splice angles and indexing pins configured to position the mating edges of two adjacent skin splice angles. As depicted, circumferential force assembly 902 restrains mating edges of skin splice angle 1302 and skin splice angle 1202. As depicted, circumferential force assembly 1208 restrains mating edges of skin splice angle 1304 and skin splice angle 1204.

Circumferential force assembly 902 has a circumferential surface clamp configured to apply pressure to mating edges of skin splice angle 1302 and skin splice angle 1202. Circumferential force assembly 902 has indexing pins configured to position the mating edges of skin splice angle 1302 and skin splice angle 1202. Circumferential force assembly 902 has an indexing pin to position skin splice angle 1302 and an indexing pin to position skin splice angle 1202.

The circumferential surface clamp of each circumferential force assembly has a first pad configured to contact an internal surface of a respective skin splice angle and a second pad configured to contact a circumferential arc of a respective skin splice angle. A closer view of a physical implementation of circumferential surface clamp can be seen in FIGS. 16 and 17.

Figure 14:
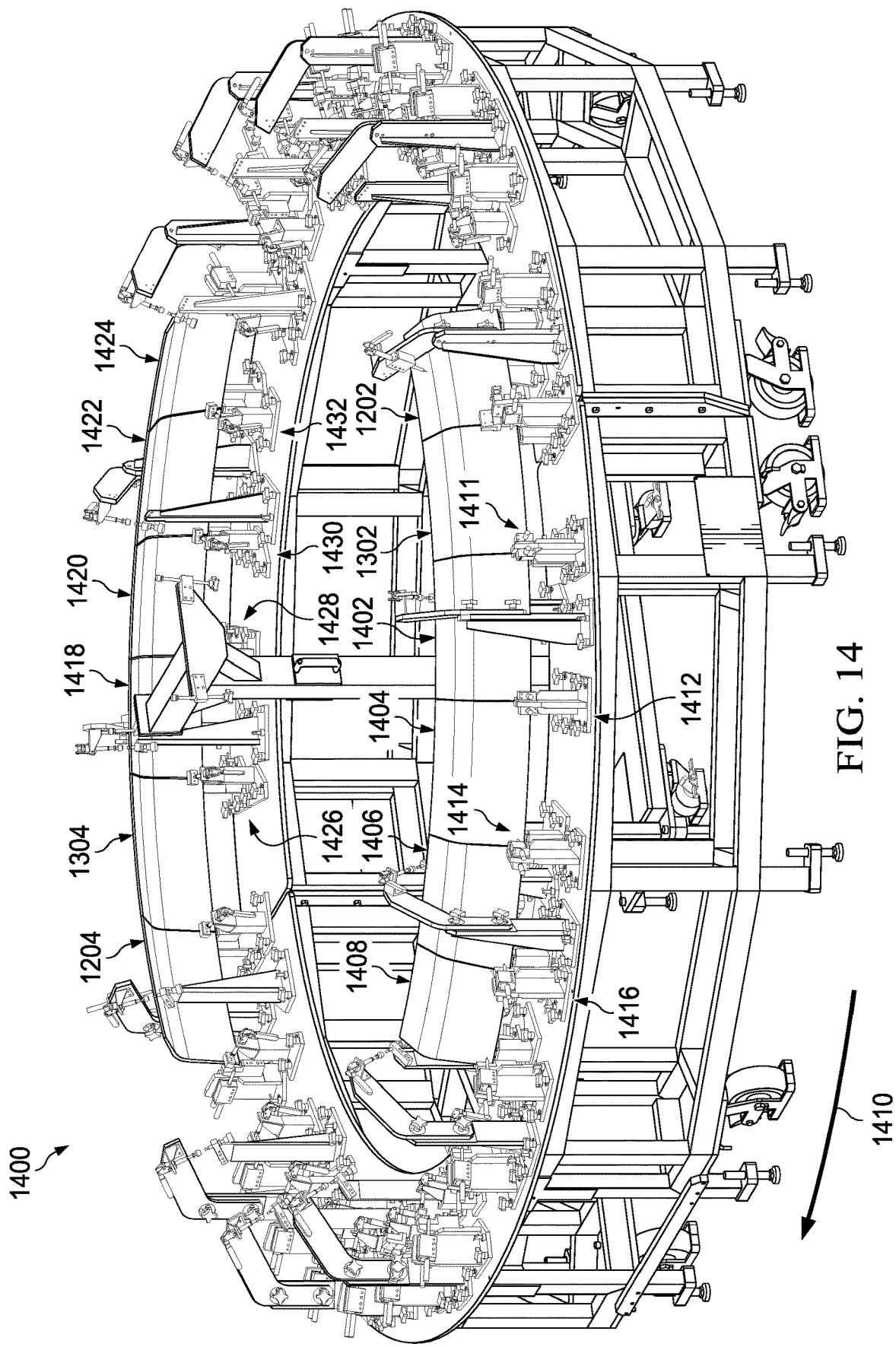
FIG. 14 is an illustration of an isometric view of skin splice angles restrained adjacent to one another in a pressure bulkhead assembly support tool in accordance with an illustrative embodiment.

Turning now to FIG. 14, an illustration of an isometric view of skin splice angles restrained adjacent to one another in a pressure bulkhead assembly support tool is depicted in accordance with an illustrative embodiment. Between view 1300 and view 1400, additional skin splice angles have been positioned and restrained by pressure bulkhead assembly support tool 704.

Between view 1300 and view 1400, skin splice angle 1402, skin splice angle 1404, skin splice angle 1406, and skin splice angle 1408 have been individually introduced onto and restrained by pressure bulkhead assembly support tool 704. Each of skin splice angle 1402, skin splice angle 1404, skin splice angle 1406, and skin splice angle 1408 is added to pressure bulkhead assembly support tool 704 individually in clockwise direction 1410. Each skin splice angle of skin splice angle 1402, skin splice angle 1404, skin splice angle 1406, and skin splice angle 1408 is restrained relative to a respective adjacent skin splice angle already present in pressure bulkhead assembly support tool 704 prior to introducing a next skin splice angle of skin splice angle 1402, skin splice angle 1404, skin splice angle 1406, and skin splice angle 1408.

Circumferential force assembly 1411 restrains mating edges of skin splice angle 1302 and skin splice angle 1402. Circumferential force assembly 1412 restrains mating edges of skin splice angle 1402 and skin splice angle 1404. Circumferential force assembly 1414 restrains mating edges of skin splice angle 1404 and skin splice angle 1406. Circumferential force assembly 1416 restrains mating edges of skin splice angle 1406 and skin splice angle 1408.

Between view 1300 and view 1400, skin splice angle 1418, skin splice angle 1420, skin splice angle 1422, and skin splice angle 1424 have been individually introduced and restrained by pressure bulkhead assembly support tool 704. Each of skin splice angle 1418, skin splice angle 1420, skin splice angle 1422, and skin splice angle 1424 is added to pressure bulkhead assembly support tool 704 individually in clockwise direction 1410. Each skin splice angle of skin splice angle 1418, skin splice angle 1420, skin splice angle 1422, and skin splice angle 1424 is restrained relative to a respective adjacent skin splice angle already present in pressure bulkhead assembly support tool 704 prior to introducing a next skin splice angle of skin splice angle 1418, skin splice angle 1420, skin splice angle 1422, and skin splice angle 1424.

Circumferential force assembly 1426 restrains mating edges of skin splice angle 1304 and skin splice angle 1418. Circumferential force assembly 1428 restrains mating edges of skin splice angle 1418 and skin splice angle 1420. Circumferential force assembly 1430 restrains mating edges of skin splice angle 1420 and skin splice angle 1422. Circumferential force assembly 1432 restrains mating edges of skin splice angle 1422 and skin splice angle 1424.

Figure 15:
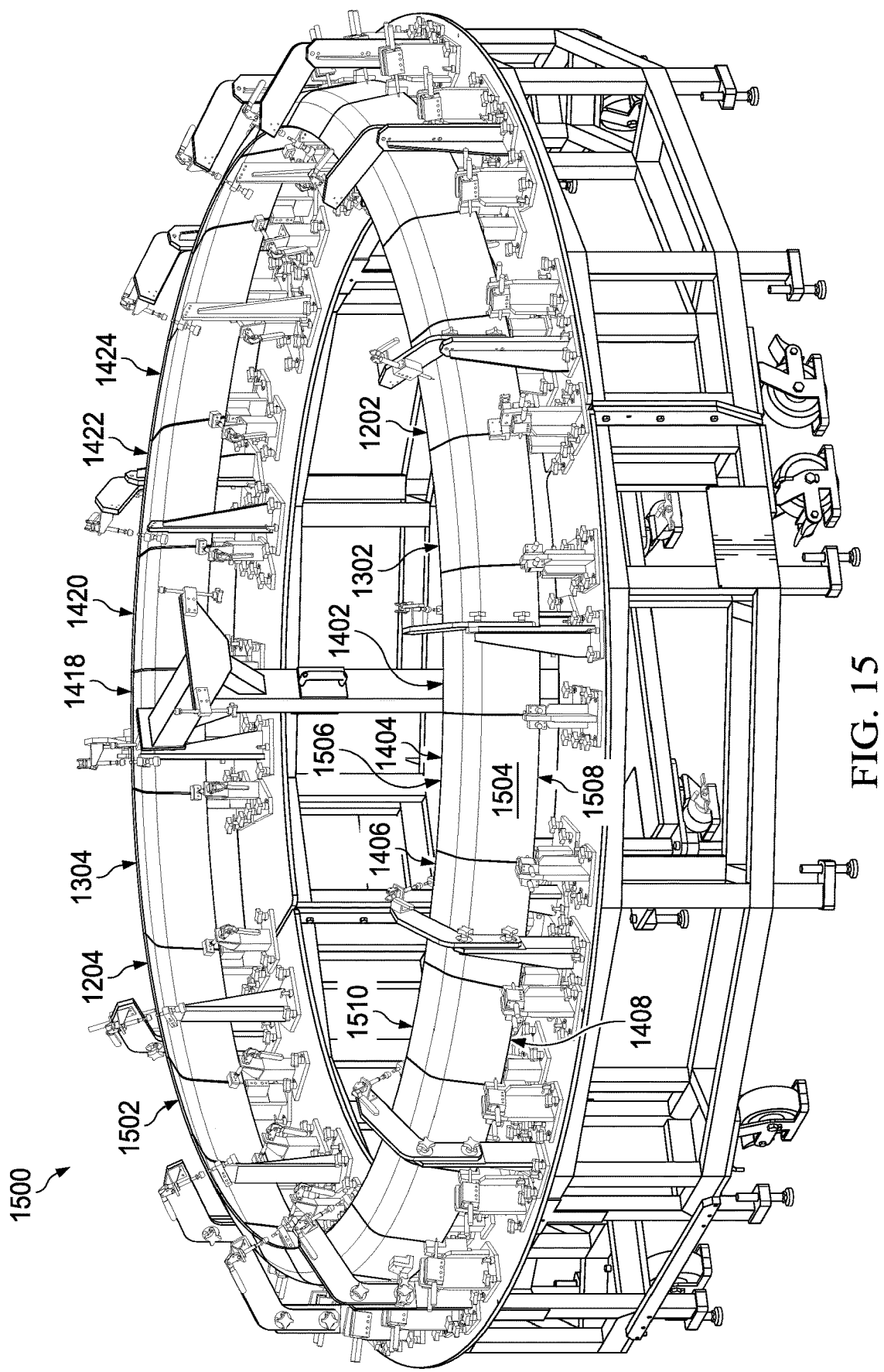
FIG. 15 is an illustration of an isometric view of skin splice angles restrained adjacent to one another in a pressure bulkhead assembly support tool such that the skin splice angles form a circumferential surface with a nominal shape in accordance with an illustrative embodiment.

Turning now to FIG. 15, an illustration of an isometric view of skin splice angles restrained adjacent to one another in a pressure bulkhead assembly support tool such that the skin splice angles form a circumferential surface with a nominal shape is depicted in accordance with an illustrative embodiment. Between view 1400 and view 1500, additional skin splice angles have been positioned and restrained by pressure bulkhead assembly support tool 704.

In view 1500 skin splice angles 1502 are positioned adjacent to one another. Skin splice angles 1502 include skin splice angle 1202, skin splice angle 1204, skin splice angle 1302, skin splice angle 1304, skin splice angle 1402, skin splice angle 1404, skin splice angle 1406, skin splice angle 1408, skin splice angle 1418, skin splice angle 1420, skin splice angle 1422, and skin splice angle 1424 of views 1200, 1300, and 1400.

Skin splice angles 1502 form circumferential surface 1504 and flange surface 1506. Circumferential surface 1504 has nominal shape 1508. Circumferential surface 1504 is held in nominal shape 1508 by plurality of circumferential force assemblies 718.

Skin splice angles 1502 will be joined to an aft pressure bulkhead to form a pressure bulkhead system. Flange 1510 having flange surface 1506 will be joined to an aft pressure bulkhead. Prior to joining skin splice angles 1502 to the aft pressure bulkhead, flange surface 1506 is scanned. Flange surface 1506 is scanned while skin splice angles 1502 are restrained by pressure bulkhead assembly support tool 704. Scanning flange surface 1506 of flange 1510 formed by skin splice angles 1502 restrained adjacent to one another in pressure bulkhead assembly support tool 704 to form a flange surface scan.

Figure 16:
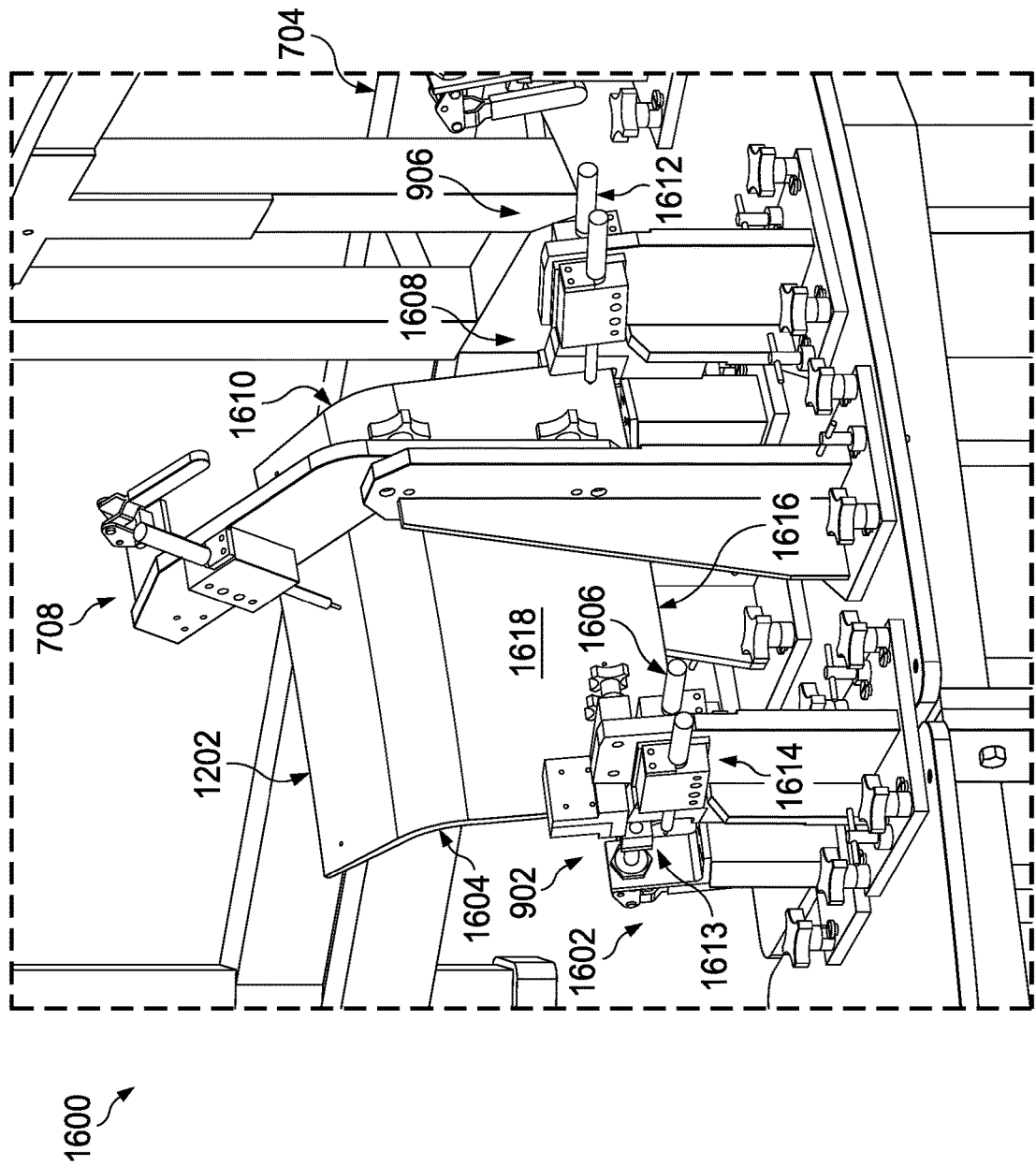
FIG. 16 is an illustration of an isometric view of a skin splice angle restrained in a pressure bulkhead assembly support tool in accordance with an illustrative embodiment.

Turning now to FIG. 16, an illustration of an isometric view of a skin splice angle restrained in a pressure bulkhead assembly support tool is depicted in accordance with an illustrative embodiment. View 1600 is a view within the box labeled FIG. 16 within FIG. 12.

In view 1600, circumferential force assembly 902, circumferential force assembly 906, and skin splice angle 1202 can be seen. Skin splice angle 1202 is indexed to pressure bulkhead assembly support tool 704 by indexing pin 708. Indexing pin 708 is configured to interface with skin splice angle 1202 and an aft pressure bulkhead.

Circumferential force assembly 902 comprises circumferential surface clamp 1602 configured to apply pressure to edge 1604 of skin splice angle 1202. Circumferential force assembly 902 further comprises indexing pins 1606 configured to position edge 1604 of skin splice angle 1202.

Circumferential force assembly 906 comprises circumferential surface clamp 1608 configured to apply pressure to edge 1610 of skin splice angle 1202. Circumferential force assembly 906 further comprises indexing pins 1612 configured to position edge 1604 of skin splice angle 1202.

Circumferential surface clamp 1602 has components on either side of skin splice angle 1202. Circumferential surface clamp 1602 has a first pad 1613 configured to contact an internal surface of skin splice angle 1202 and second pad 1614 configured to contact circumferential arc 1618 of skin splice angle 1202.

Each circumferential force assembly of plurality of circumferential force assemblies 606 comprises a circumferential surface clamp configured to apply pressure to mating edges of skin splice angles and indexing pins configured to position the mating edges of two adjacent skin splice angles. As depicted, circumferential surface clamp 1602 has exposed surfaces that could be used to apply pressure to a mating edge of another skin splice angle, such as skin splice angle 1302 of FIG. 13.

Circumferential force assembly 906 has a circumferential surface clamp configured to apply pressure to mating edges of skin splice angle 1302 of FIG. 13 and skin splice angle 1202. Circumferential force assembly 906 has indexing pins configured to position the mating edges of skin splice angle 1302 of FIG. 13 and skin splice angle 1202. Circumferential force assembly 906 has an indexing pin to position skin splice angle 1302 of FIG. 13 and an indexing pin to position skin splice angle 1202. The circumferential surface clamp of each circumferential force assembly has a first pad configured to contact an internal surface of a respective skin splice angle and a second pad configured to contact a circumferential arc of a respective skin splice angle.

Although the term first pad used, any desirable quantity of pad portions may contact an internal surface of skin splice angle 1202. One or more pads are present in circumferential surface clamp 1602 and are configured to contact an internal surface of skin splice angle 1202. Additionally, although the term second pad is used, any desirable quantity of pad materials may contact circumferential arc 1618 of skin splice angle 1202. One or more pads are present in circumferential surface clamp 1602 to contact circumferential arc 1618 of skin splice angle 1202.

Figure 17:
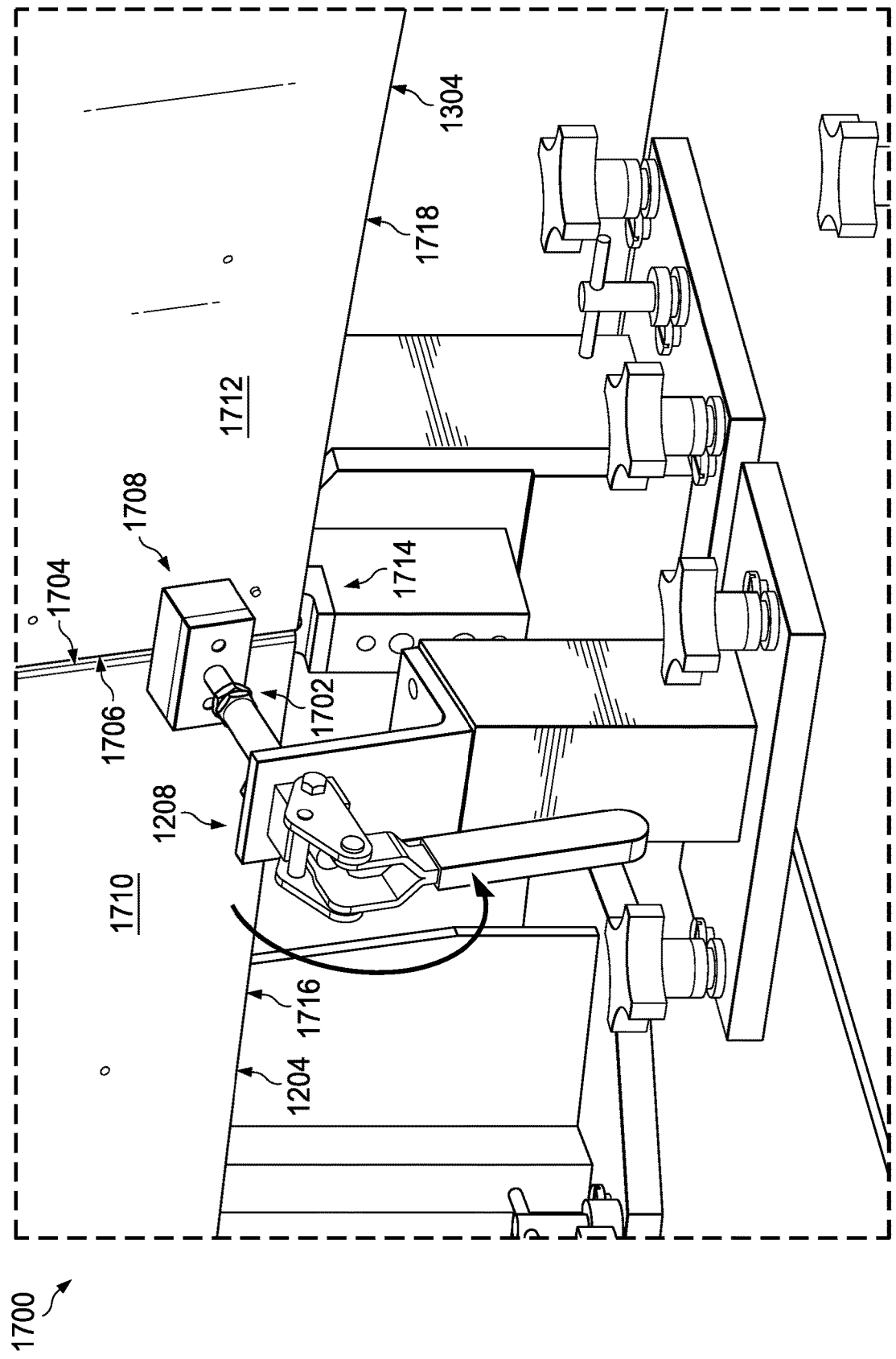
FIG. 17 is an illustration of a back-isometric view of two skin splice angles restrained adjacent each other in a pressure bulkhead assembly support tool in accordance with an illustrative embodiment.

Turning now to FIG. 17, an illustration of a back-isometric view of two skin splice angles restrained adjacent each other in a pressure bulkhead assembly support tool is depicted in accordance with an illustrative embodiment. View 1700 is view within the box in FIG. 13 labeled as FIG. 17. In view 1700, circumferential force assembly 1208, and skin splice angle 1204, and skin splice angle 1304 can be seen.

Circumferential force assembly 1208 comprises circumferential surface clamp 1702 configured to apply pressure to mating edges of skin splice angles. As depicted, circumferential force assembly 1208 comprises circumferential surface clamp 1702 configured to apply pressure to edge 1704 of skin splice angle 1204 and edge 1706 of skin splice angle 1304.

Circumferential surface clamp 1702 has components on either side of skin splice angle 1204. Circumferential surface clamp 1702 has first pad 1708 configured to contact internal surface 1710 of skin splice angle 1204 and internal surface 1712 of skin splice angle 1304. Circumferential surface clamp 1702 also has second pad 1714 configured to contact a circumferential arc of skin splice angle 1204. Second pad 1714 is configured to contact a circumferential arc of skin splice angle 1304.

Figure 18:
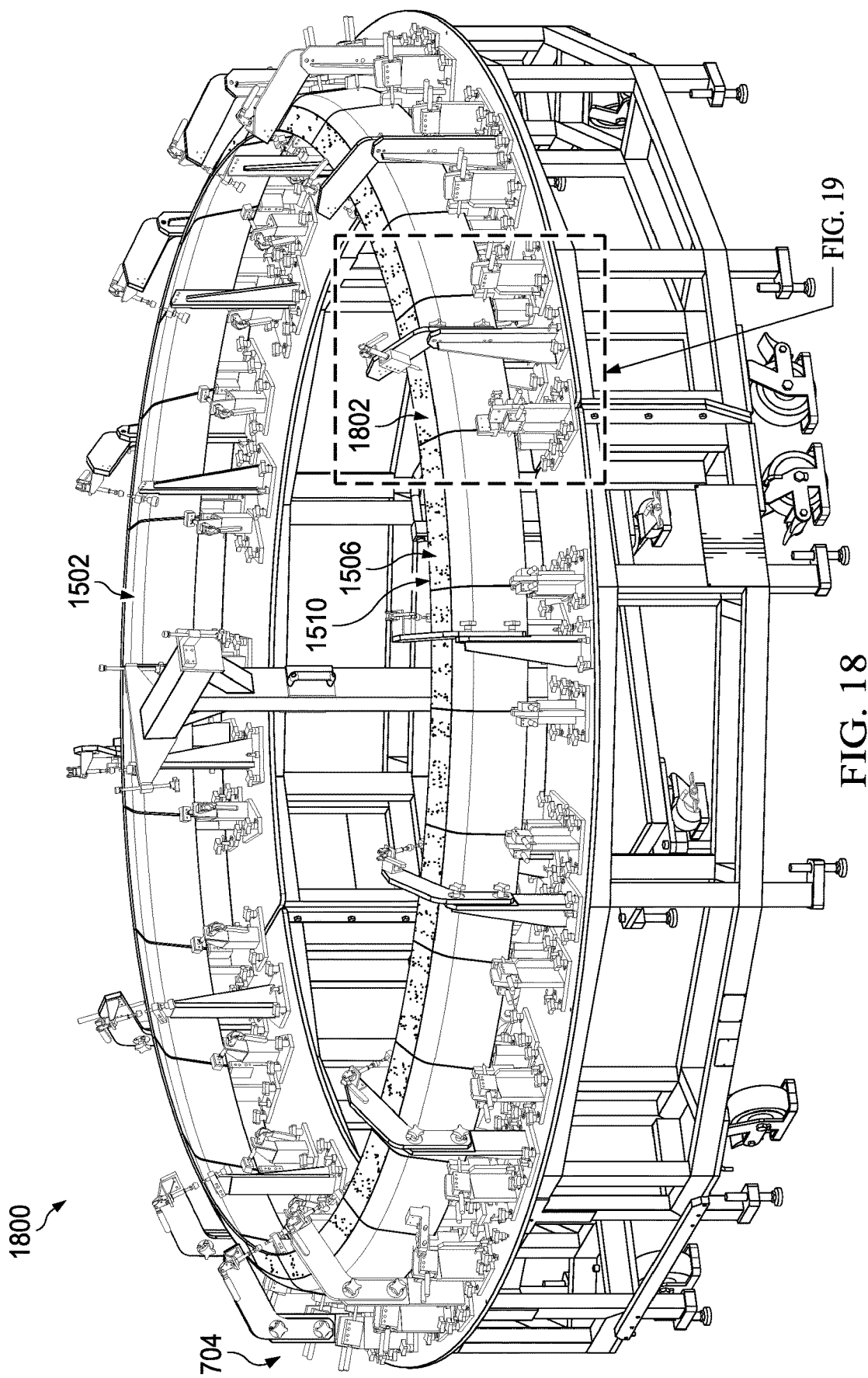
FIG. 18 is an illustration of an isometric view of skin splice angles restrained adjacent to one another in a pressure bulkhead assembly support tool such that the skin splice angles form a flange surface and a plurality of shims on the flange surface in accordance with an illustrative embodiment.

Turning now to FIG. 18, an illustration of an isometric view of skin splice angles restrained adjacent to one another in a pressure bulkhead assembly support tool such that the skin splice angles form a flange surface and a plurality of shims on the flange surface is depicted in accordance with an illustrative embodiment. View 1800 is a view of skin splice angles 1502 restrained on pressure bulkhead assembly support tool 704. Between view 1700 and view 1800, plurality of shims 1802 are attached to flange surface 1506 of flange 1510.

Plurality of shims 1802 is configured to fill gaps between flange surface 1506 and bulkhead interface surface 1108 of aft pressure bulkhead 702. By attaching plurality of shims 1802 to flange surface 1506, out of tolerance gaps are not present between bulkhead interface surface 1108 and flange surface 1506 when flange 1510 is attached to aft pressure bulkhead 702.

By attaching plurality of shims 1802, circumferential surface 1504 maintains nominal shape 1508 when skin splice angles 1502 are joined to aft pressure bulkhead 702. Joining plurality of shims 1802 to aft pressure bulkhead 702 forms a pressure bulkhead system, such as pressure bulkhead system 2300 of FIG. 23. By maintaining nominal shape 1508 of circumferential surface 1504, gaps between the pressure bulkhead system and a skin of an aircraft are reduced. Reducing gaps between the resulting pressure bulkhead system and a skin of an aircraft reduces the quantity of shimming.

Figure 19:
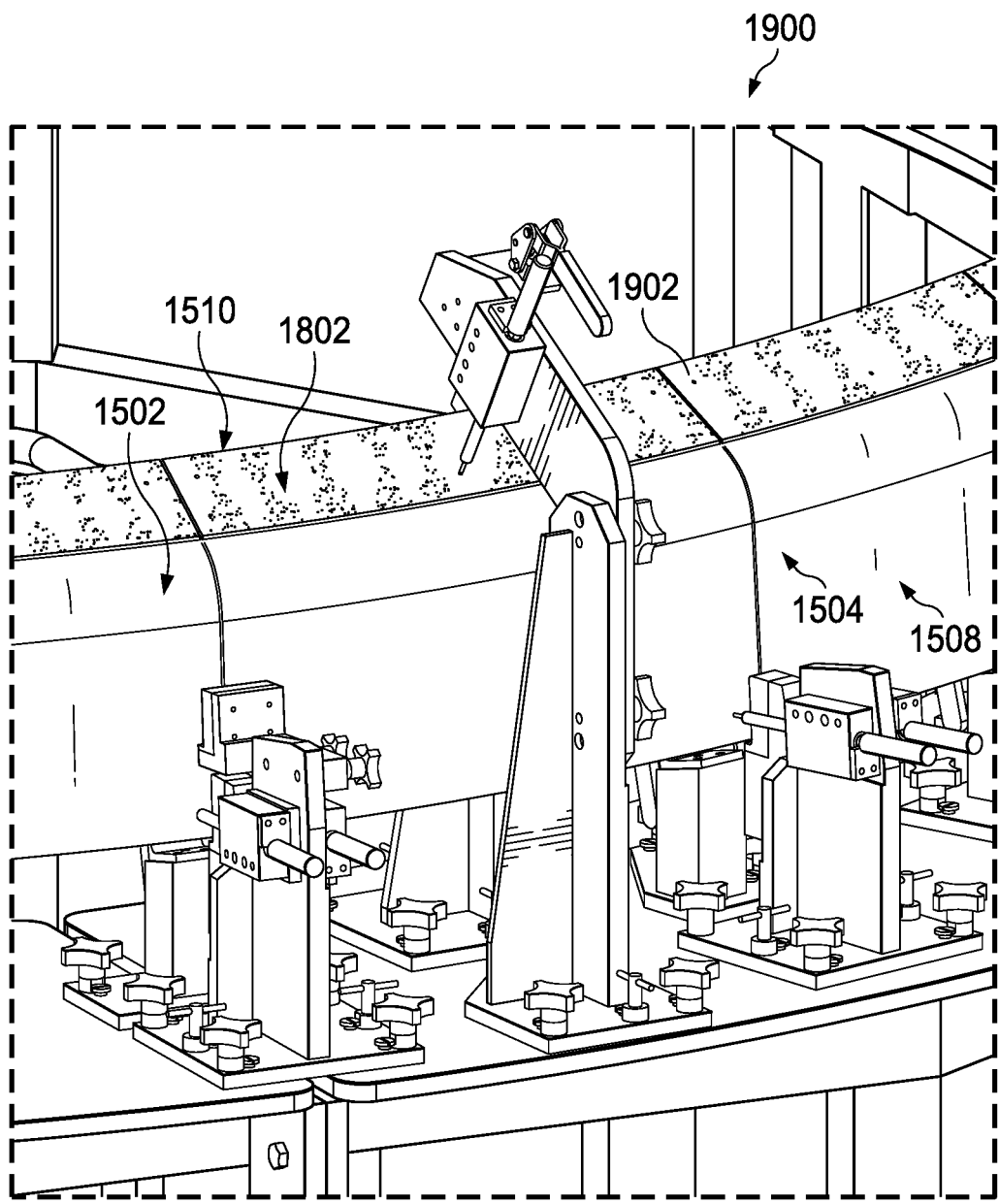
FIG. 19 is an illustration of an isometric view of a plurality of shims on a flange surface formed by skin splice angles restrained adjacent to one another in a pressure bulkhead assembly support tool in accordance with an illustrative embodiment.

Turning now to FIG. 19, an illustration of an isometric view of a plurality of shims on a flange surface formed by skin splice angles restrained adjacent to one another in a pressure bulkhead assembly support tool is depicted in accordance with an illustrative embodiment. View 1900 of plurality of shims 1802 is a view within the box labeled FIG. 19 in FIG. 18.

Plurality of shims 1802 are attached to flange 1510 in any desirable fashion. In view 1900, index holes 1902 are visible. In some illustrative examples, fasteners extending through index holes 1902 attach plurality of shims 1802 to flange 1510. In some illustrative examples, the fasteners attaching plurality of shims 1802 to flange 1510 are temporary fasteners.

Figure 20:
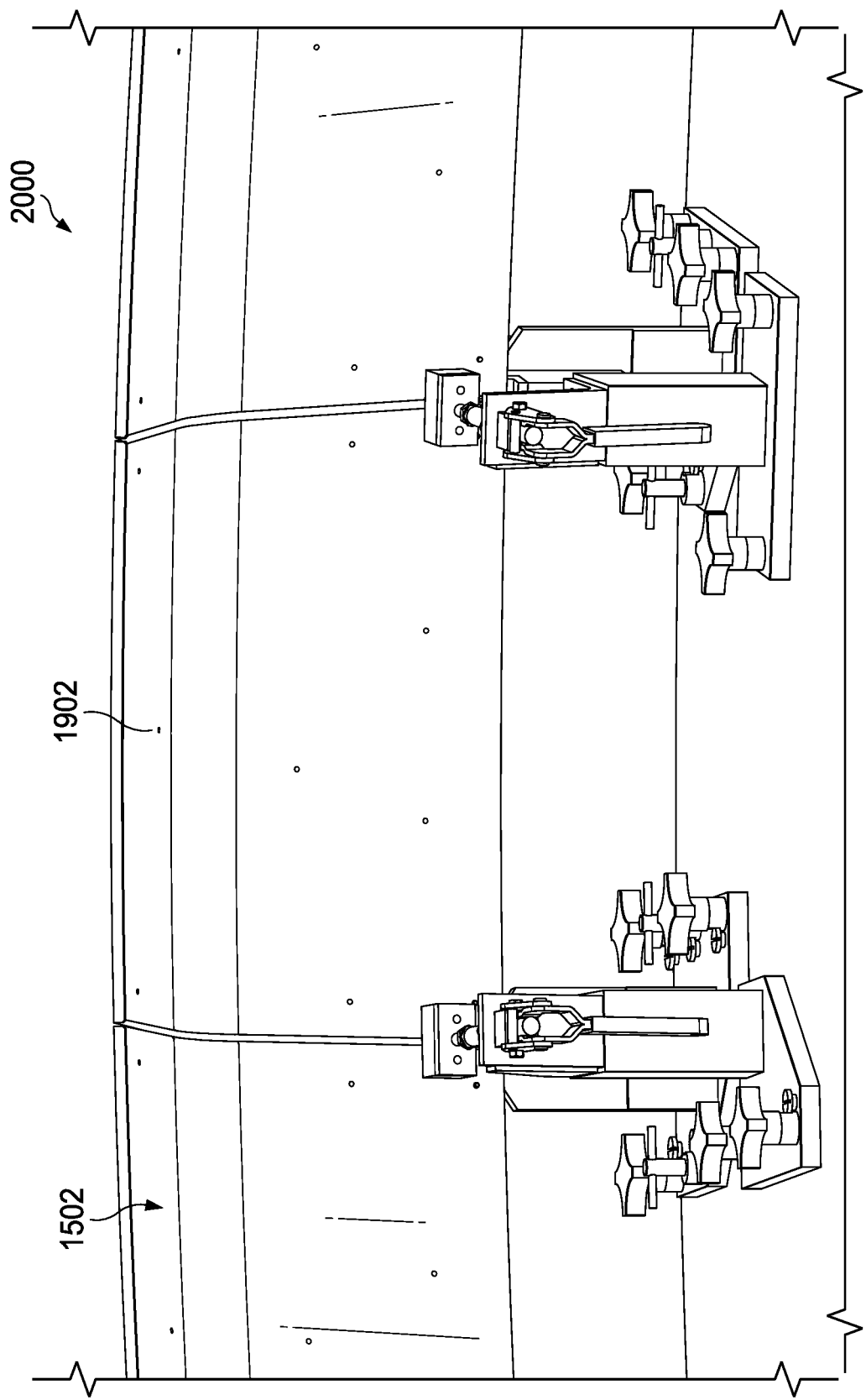
FIG. 20 is an illustration of a back view of skin splice angles restrained adjacent to one another in a pressure bulkhead assembly support tool in accordance with an illustrative embodiment.

Turning now to FIG. 20, an illustration of a back view of skin splice angles restrained adjacent to one another in a pressure bulkhead assembly support tool is depicted in accordance with an illustrative embodiment. View 2000 is an interior view of components shown in FIG. 19.

In view 2000, interior surfaces of skin splice angles 1502 are visible. View 2000 is a back view of index holes 1902 of FIG. 19.

Figure 21:
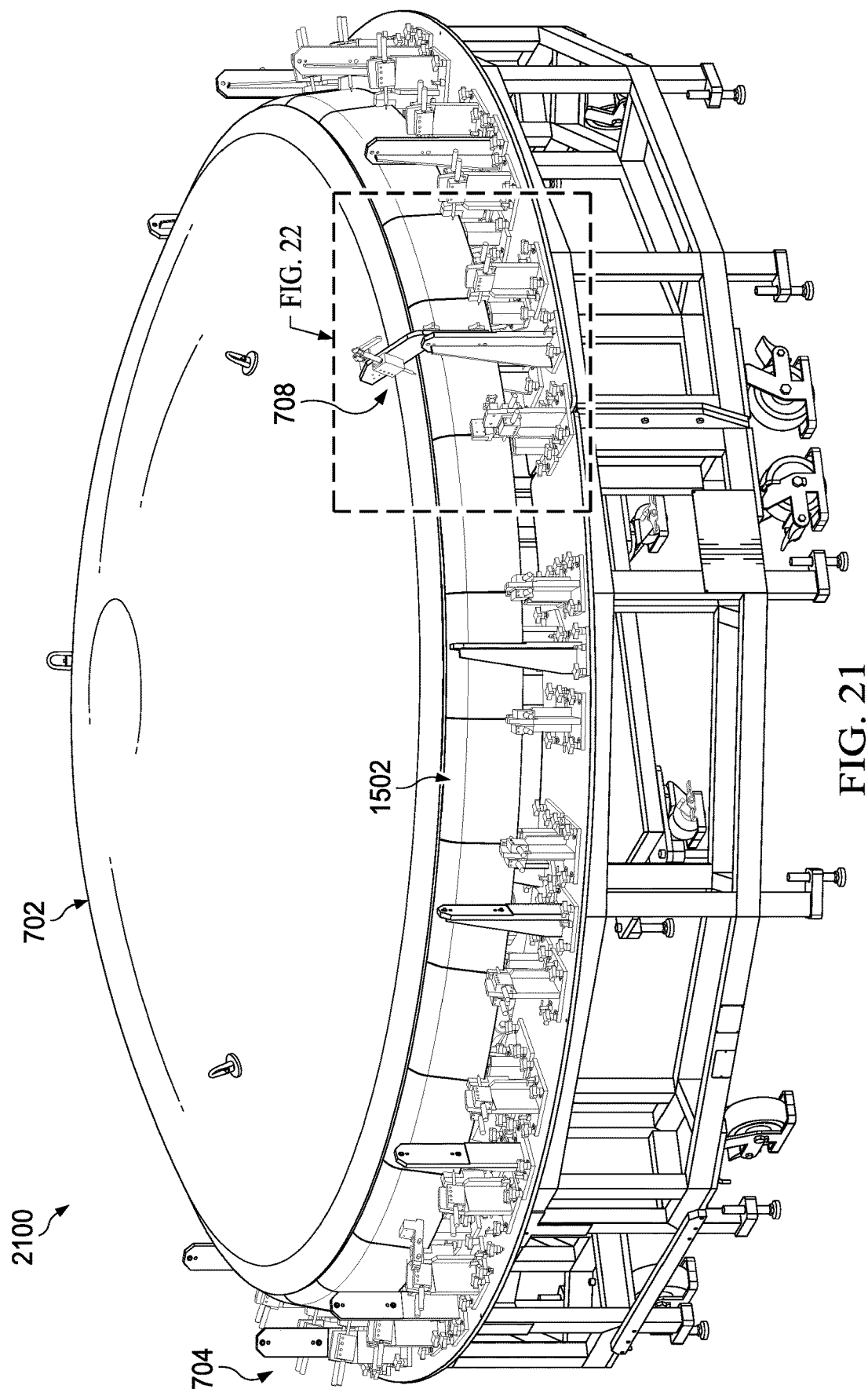
FIG. 21 is an illustration of an isometric view of an aft pressure bulkhead on skin splice angles restrained adjacent to one another in a pressure bulkhead assembly support tool in accordance with an illustrative embodiment.

Turning now to FIG. 21, an illustration of an isometric view of an aft pressure bulkhead on skin splice angles restrained adjacent to one another in a pressure bulkhead assembly support tool is depicted in accordance with an illustrative embodiment. In view 2100, aft pressure bulkhead 702 has been positioned over plurality of shims 1802 to flange 1510. In view 2100, plurality of shims 1802 is not visible. In view 2100, plurality of shims 1802 is between flange surface 1506 and bulkhead interface surface 1108.

In view 2100, aft pressure bulkhead 702 has been lowered onto skin splice angles 1502 restrained adjacent to one another in pressure bulkhead assembly support tool 704. In view 2100, indexing pin 708 indexes aft pressure bulkhead 702 and skin splice angles 1502 to pressure bulkhead assembly support tool 704. Aft pressure bulkhead 702 and flange 1510 formed by skin splice angles 1502 are joined while plurality of shims 1802 is positioned between flange surface 1506 and bulkhead interface surface 1108. In some illustrative examples, joining aft pressure bulkhead 702 and flange 1510 formed by skin splice angles 1502 comprises joining skin splice angles 1502 to aft pressure bulkhead 702 while skin splice angles 1502 are restrained adjacent to one another in pressure bulkhead assembly support tool 704 to form a pressure bulkhead system.

Figure 22:
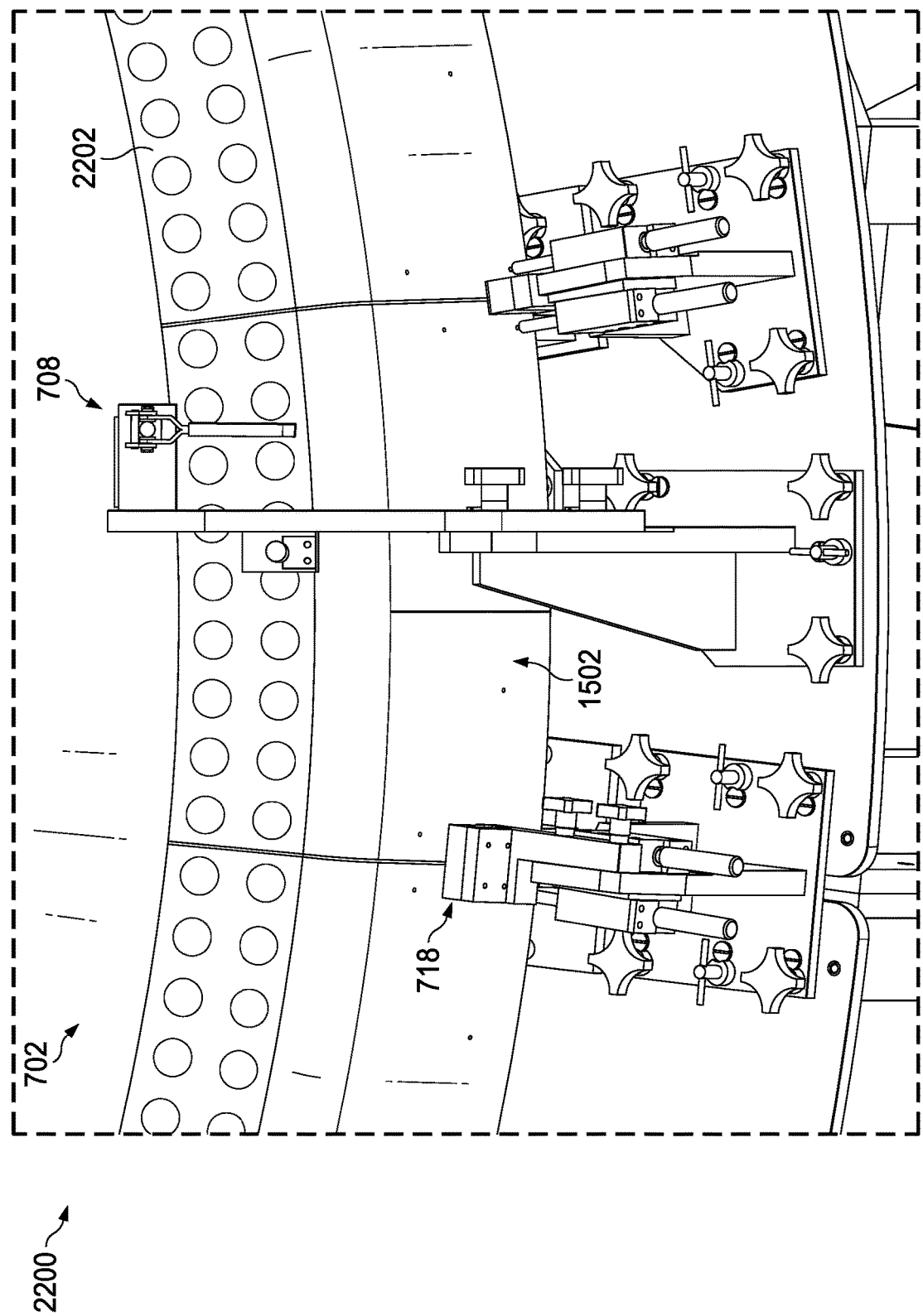
FIG. 22 is an illustration of an isometric view of a drilling plate on an aft pressure bulkhead in accordance with an illustrative embodiment.

Turning now to FIG. 22, an illustration of an isometric view of a drilling plate on an aft pressure bulkhead is depicted in accordance with an illustrative embodiment. View 2200 is a view of a portion of aft pressure bulkhead 702 within the box labeled FIG. 22 in FIG. 21. In view 2200, drill plates 2202 have been placed onto aft pressure bulkhead 702. To join aft pressure bulkhead 702 to flange 1510 of FIG. 15, holes are drilled into aft pressure bulkhead 702 and flange 1510 of FIG. 15. After drilling holes into aft pressure bulkhead 702 and flange 1510, fasteners are placed into the holes to join aft pressure bulkhead 702 to flange 1510.

Figure 23:
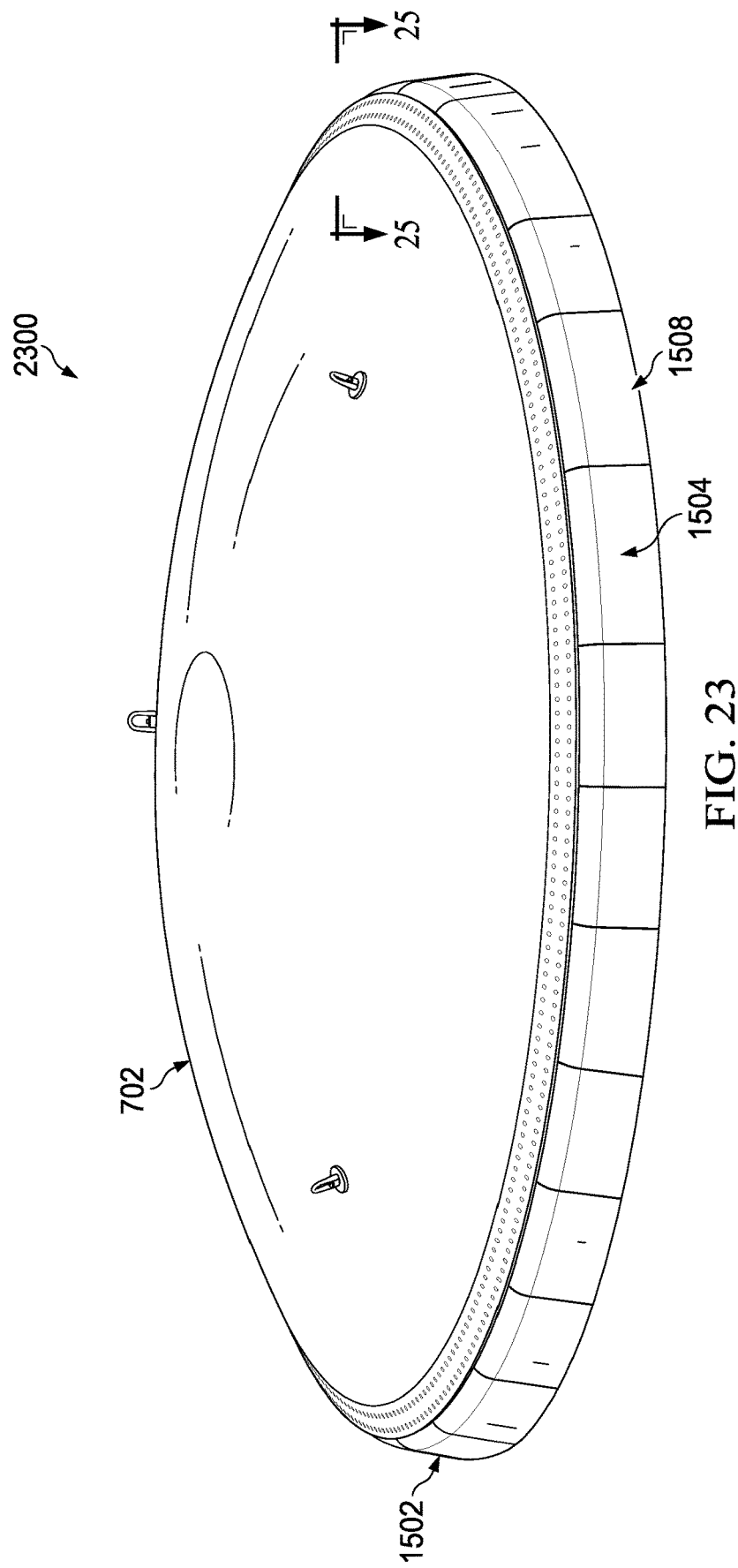
FIG. 23 is an illustration of a side view of a pressure bulkhead system in accordance with an illustrative embodiment.

Turning now to FIG. 23, an illustration of a side view of a pressure bulkhead system is depicted in accordance with an illustrative embodiment. Pressure bulkhead system 2300 is a physical implementation of pressure bulkhead system 102 of FIG. 1. Pressure bulkhead system 2300 is a structure formed of aft pressure bulkhead 702 of FIGS. 7-11 and 21, and skin splice angles 1502 of FIGS. 15-22. In this illustrative example, aft pressure bulkhead 702 and skin splice angles 1502 are comprised of composite material.

Pressure bulkhead system 102 comprises aft pressure bulkhead 702 having bulkhead interface surface 1108 (not visible), skin splice angles 1502 positioned adjacent to one another and joined to aft pressure bulkhead 702, and plurality of shims 1802 (not visible) between flange surface 1506 (not visible) and bulkhead interface surface 1108 (not visible) of aft pressure bulkhead 702. Skin splice angles 1502 form circumferential surface 1504 and flange surface 1506 (not visible). Circumferential surface 1504 has nominal shape 1508.

Plurality of shims 1802 fills gaps between bulkhead interface surface 1108 (not visible) and flange surface 1506 (not visible) when circumferential surface 1504 has nominal shape 1508. Pressure bulkhead system 2300 will divide a pressurized side of an aircraft from an unpressurized side of the aircraft. Skin splice angles 1502 are joined at bulkhead interface surface 1108 (not visible) on a pressurized side of aft pressure bulkhead 702. Skin splice angles 1502 are configured to form a pressure seal for a fuselage.

Figure 24:
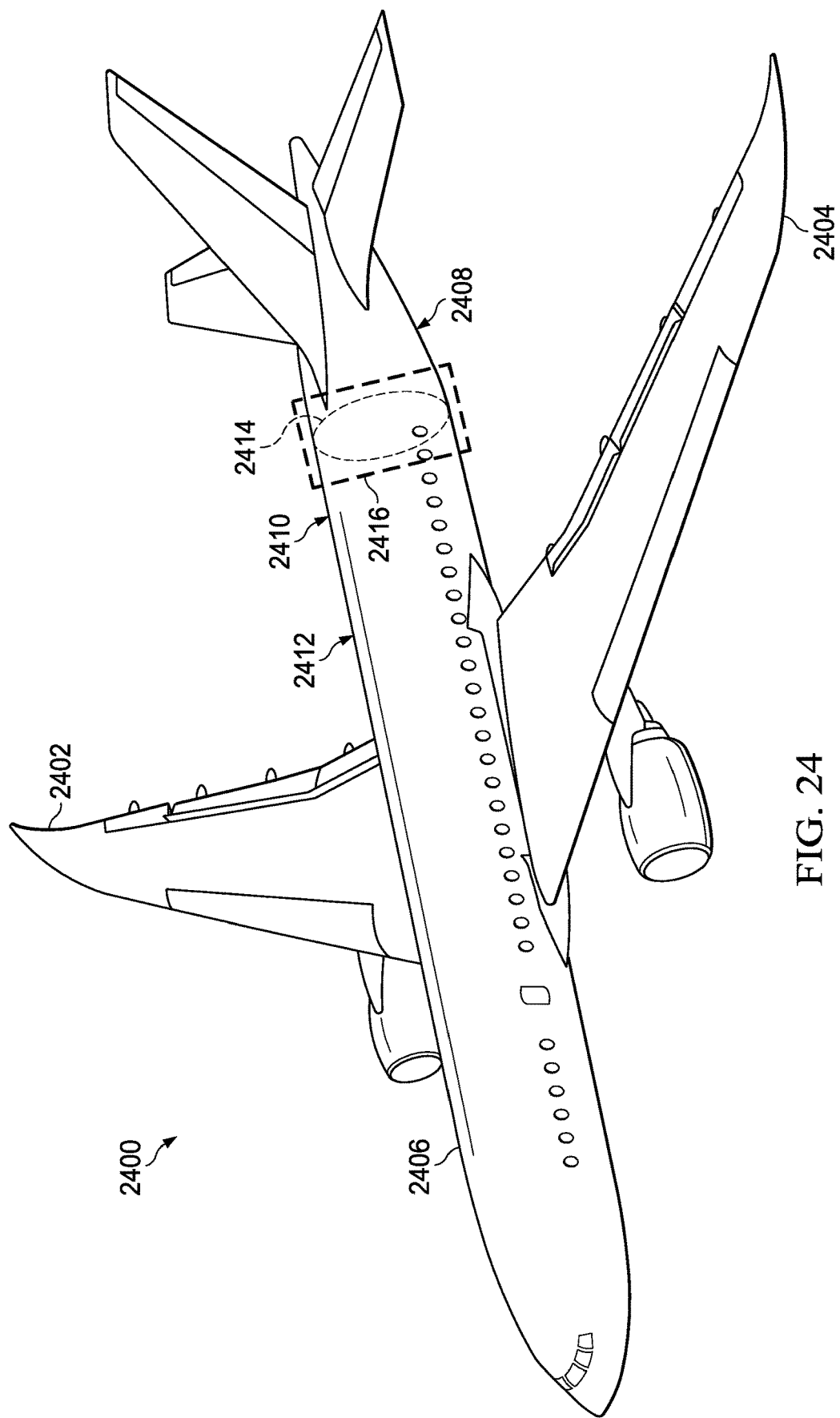
FIG. 24 is an illustration of an aircraft in accordance with an illustrative embodiment.

Turning now to FIG. 24, an illustration of an aircraft is depicted in accordance with an illustrative embodiment. Aircraft 2400 is a physical implementation of an aircraft in which pressure bulkhead system 102 of FIG. 1 may be present. In this illustrative example, aircraft 2400 has wing 2402 and wing 2404 attached to fuselage 2406.

Fuselage 2406 has section 2408 and section 2410. Skin 2412 of fuselage 2406 is comprised of a composite material. Aft pressure bulkhead 2414 separates section 2408 from section 2410 in portion 2416 of fuselage 2406. Aircraft 2400 is an example of an aircraft in which a pressure bulkhead system may be implemented in accordance with an illustrative embodiment.

Figure 25:
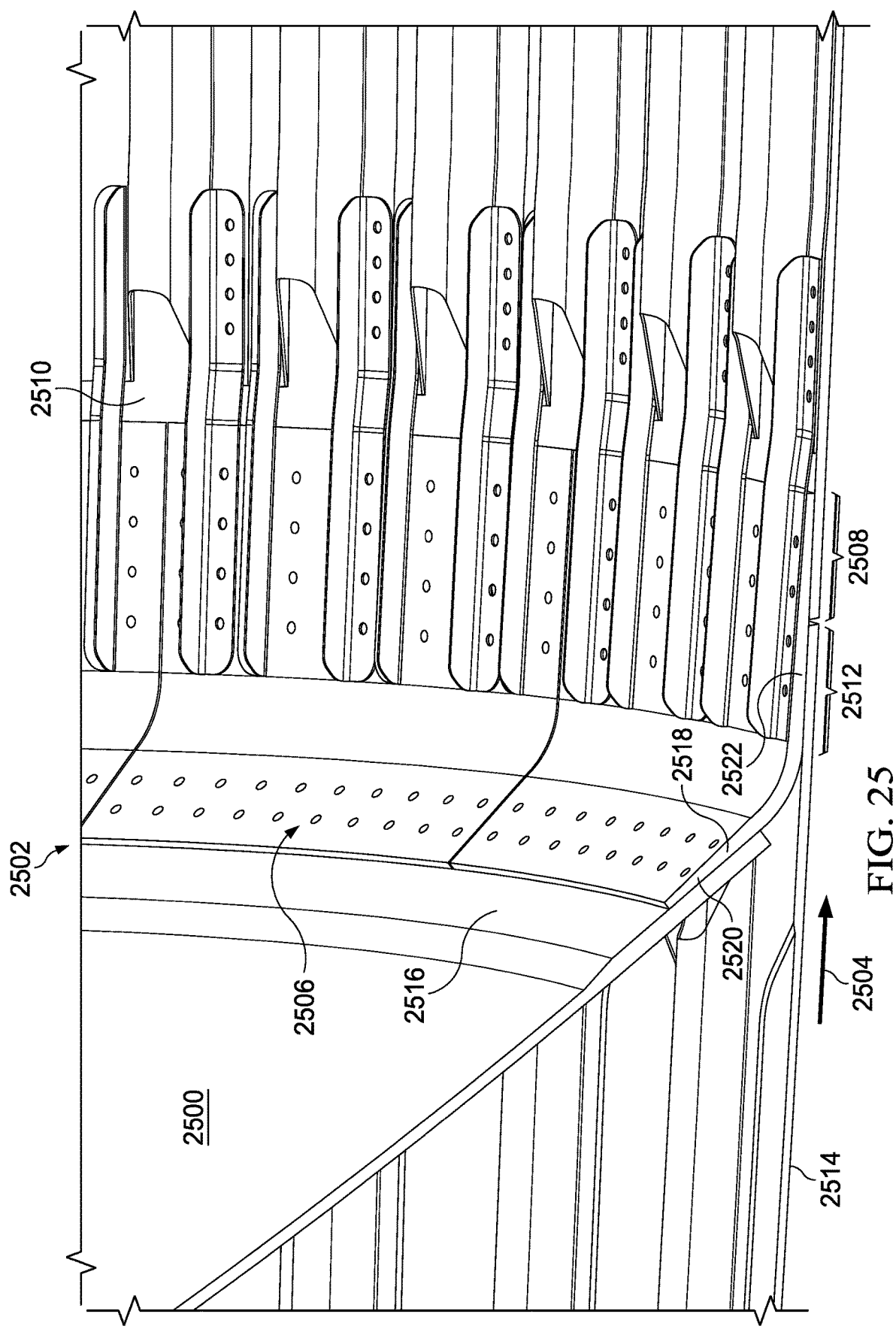
FIG. 25 is an illustration of a cross-sectional view of a pressure bulkhead system in an aircraft in accordance with an illustrative embodiment.

In FIG. 25, an illustration of a cross-sectional view of a pressure bulkhead system in an aircraft is depicted in accordance with an illustrative embodiment. Pressure bulkhead system 2500 is a physical implementation of pressure bulkhead system 102 of FIG. 1. View 2502 is a view within portion 2416 of aircraft 2400 of FIG. 24.

In some illustrative examples, pressure bulkhead system 2500 is the same as pressure bulkhead system 2300 of FIG. 23. In these illustrative examples, view 2502 is a cross-sectional view of pressure bulkhead system 2300 along the lines 25-25 in FIG. 23. Arrow 2504 indicates the direction of the forward portion of the aircraft.

Skin splice angles 2506 overlap portion 2508 of skin 2510 of section 2410 as well as portion 2512 of skin 2514 of section 2408. In this manner, skin splice angles 2506 join all three parts together. Skin splice angles 2506 taper slightly in thickness toward the edges. However, tapering is optional in the flange that connects each of skin splice angles 2506 to aft pressure bulkhead 2516.

Additionally, a plurality of shims is present between skin splice angles 2506 and aft pressure bulkhead 2516. However, the plurality of shims is not visible in FIG. 25. The plurality of shims fills gaps between bulkhead interface surface 2518 and flange surface 2520 when circumferential surface 2522 has the nominal shape.

During installation, pressure bulkhead system is attached to section 2408. Section 2410 is then positioned adjacent to section 2408 such that skin splice angles 2506 overlap portion 2508 of skin 2510. Shims between portion 2508 of skin 2510 and circumferential surface 2522 are reduced or eliminated when circumferential surface 2522 has the nominal shape. Shims between portion 2508 of skin 2510 and circumferential surface 2522 are reduced or eliminated when the plurality of shims between bulkhead interface surface 2518 and flange surface 2520 are present to maintain circumferential surface 2522 in the nominal shape. Holes are drilled from the outer surface of skin 2510 through skin splice angles 2506 and skin splice angles 2506 at the same time.

Skin splice angles 2506 are joined at bulkhead interface surface 2518 on a pressurized side of aft pressure bulkhead 2516. Skin splice angles 2506 are configured to form a pressure seal for fuselage 2406 of FIG. 24.

Figure 26:
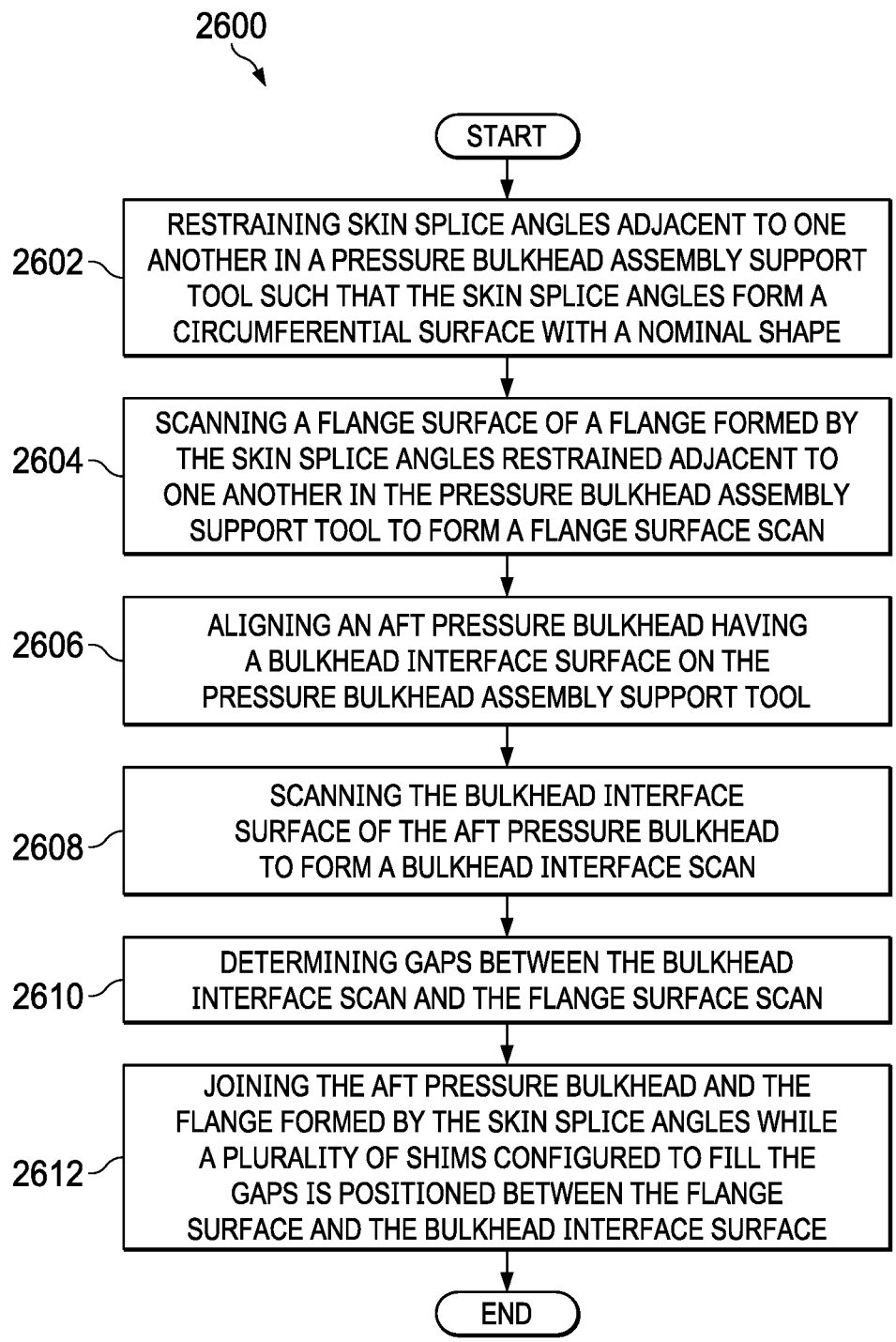
FIG. 26 is an illustration of a flowchart of a process of assembling a pressure bulkhead system in accordance with an illustrative embodiment.

Turning now to FIG. 26, an illustration of a flowchart of a process of assembling a pressure bulkhead system is depicted in accordance with an illustrative embodiment. Method 2600 is a method of forming pressure bulkhead system 102 of FIG. 1. Method 2600 may be performed using pressure bulkhead assembly support tool 128 of FIG. 1. Method 2600 may form a pressure bulkhead system using aft pressure bulkhead 200 of FIG. 2. Method 2600 may form a pressure bulkhead system using aft pressure bulkhead 702 of FIG. 7. Method 2600 may be performed using pressure bulkhead assembly support tool 600 of FIG. 6. Method 2600 may restrain skin splice angles 1502 of FIG. 15. Method 2600 may use pressure bulkhead assembly support tool 704 of FIGS. 7-22. Method 2600 may form pressure bulkhead system 2300 of FIG. 23. Method 2600 may form pressure bulkhead system 2414 of FIG. 24. Method 2600 may form pressure bulkhead system 2500 of FIG. 25.

Method 2600 restrains skin splice angles adjacent to one another in a pressure bulkhead assembly support tool such that the skin splice angles form a circumferential surface with a nominal shape (operation 2602). The nominal shape is within a desired tolerance of a designed shape for the circumferential surface.

Method 2600 scans a flange surface of a flange formed by the skin splice angles restrained adjacent to one another in the pressure bulkhead assembly support tool to form a flange surface scan (operation 2604). The flange surface is a surface of the skin splice angles configured to be joined to a bulkhead interface surface of an aft pressure bulkhead.

Method 2600 aligns an aft pressure bulkhead having a bulkhead interface surface on the pressure bulkhead assembly support tool (operation 2606). The aft pressure bulkhead is lowered onto the pressure bulkhead assembly support tool using any desirable method or tooling. The aft pressure bulkhead is aligned on the pressure bulkhead assembly support tool using a plurality of alignment probes of the pressure bulkhead assembly support tool. The aft pressure bulkhead is indexed to the pressure bulkhead assembly support tool using a number of indexing pins. The number of indexing pins are configured to interface with both the aft pressure bulkhead and a respective skin splice angle to align and provide an optional consolidation clamp force.

Method 2600 scans the bulkhead interface surface of the aft pressure bulkhead to form a bulkhead interface scan (operation 2608). Method 2600 determines gaps between the bulkhead interface scan and the flange surface scan (operation 2610).

Method 2600 joins the aft pressure bulkhead and the flange formed by the skin splice angles while a plurality of shims configured to fill the gaps is positioned between the flange surface and the bulkhead interface surface (operation 2612). Joining the aft pressure bulkhead and the flange while the plurality of shims is positioned between the flange surface and the bulkhead interface surface forms the pressure bulkhead system. Afterwards, method 2600 terminates.

Figure 27:
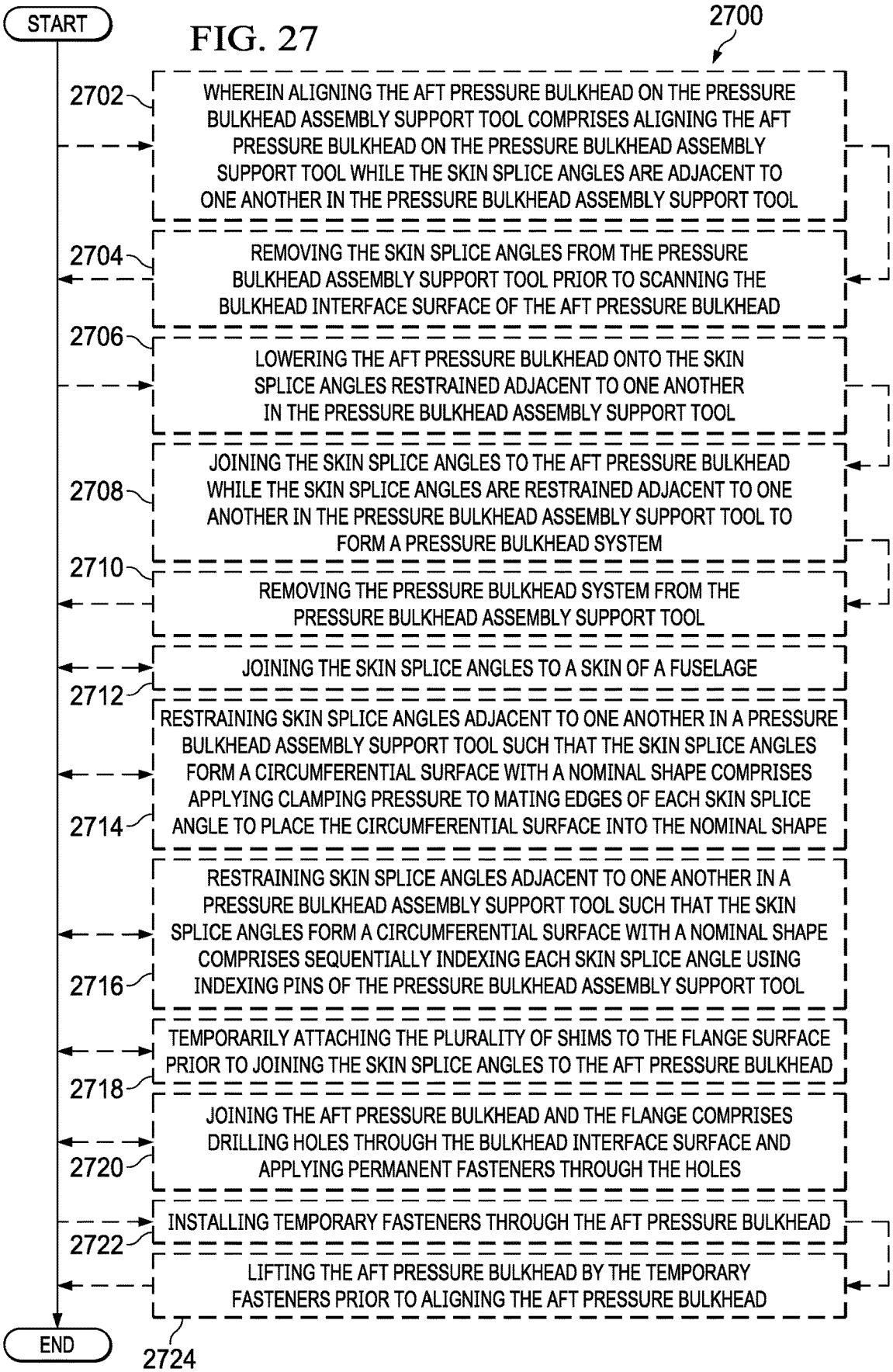
FIG. 27 is an illustration of a flowchart of optional operations for a process of assembling a pressure bulkhead system in accordance with an illustrative embodiment.

Turning now to FIG. 27, an illustration of a flowchart of optional operations for a process of assembling a pressure bulkhead system is depicted in accordance with an illustrative embodiment. Operations of method 2700 may be optional operations for method 2600 of FIG. 26.

In some illustrative examples, aligning the aft pressure bulkhead on the pressure bulkhead assembly support tool comprises aligning the aft pressure bulkhead on the pressure bulkhead assembly support tool while the skin splice angles are adjacent to one another in the pressure bulkhead assembly support tool (operation 2702). In these illustrative examples, the skin splice angles provide additional support to the aft pressure bulkhead. In some illustrative examples, the aft pressure bulkhead is sufficiently flexible to be undesirably difficult to align the aft pressure bulkhead to the pressure bulkhead assembly support tool without the skin splice angles.

In some of these illustrative examples, method 2700 removes the skin splice angles from the pressure bulkhead assembly support tool prior to scanning the bulkhead interface surface of the aft pressure bulkhead (operation 2704). In these illustrative examples, the skin splice angles are used to support the aft pressure bulkhead during indexing and alignment, but are removed for scanning the bulkhead interface surface after aligning the aft pressure bulkhead.

Method 2700 lowers the aft pressure bulkhead onto the skin splice angles restrained adjacent to one another in the pressure bulkhead assembly support tool (operation 2706). The aft pressure bulkhead is lowered onto the skin splice angles while the plurality of shims is attached to at least one of the flange surface or the bulkhead interface surface.

In some illustrative examples, joining the aft pressure bulkhead and the flange formed by the skin splice angles comprises joining the skin splice angles to the aft pressure bulkhead while the skin splice angles are restrained adjacent to one another in the pressure bulkhead assembly support tool to form a pressure bulkhead system (operation 2708). By joining the aft pressure bulkhead to the skin splice angles while the skin splice angles are restrained adjacent to each other, the circumferential surface is maintained with a nominal shape.

Method 2700 removes the pressure bulkhead system from the pressure bulkhead assembly support tool (operation 2710). The pressure bulkhead system is removed as an assembled system from the pressure bulkhead assembly support tool after joining the aft pressure bulkhead to the skin splice angles.

Method 2700 joins the skin splice angles to a skin of a fuselage (operation 2712). When the skin splice angles are joined to the skin of the fuselage, a reduced quantity of shims is placed between the pressure bulkhead system and the skin. The quantity of shims is reduced compared to how many shims would be used to shim between the skin and a pressure bulkhead system formed without the plurality of shims between the flange of the bulkhead interface surface. The plurality of shims between the skin splice angles and the aft pressure bulkhead maintains the nominal shape of the circumferential surface so that shimming between the pressure bulkhead system and the skin is reduced.

In some illustrative examples, restraining skin splice angles adjacent to one another in a pressure bulkhead assembly support tool such that the skin splice angles form a circumferential surface with a nominal shape comprises applying clamping pressure to mating edges of each skin splice angle to place the circumferential surface into the nominal shape (operation 2714).

In some illustrative examples, restraining skin splice angles adjacent to one another in a pressure bulkhead assembly support tool such that the skin splice angles form a circumferential surface with a nominal shape comprises sequentially indexing each skin splice angle using indexing pins of the pressure bulkhead assembly support tool (operation 2716). In these illustrative examples, the number of indexing pins In some illustrative examples, method 2700 temporarily attaches the plurality of shims to the flange surface prior to joining the skin splice angles to the aft pressure bulkhead (operation 2718).

In some illustrative examples, joining the aft pressure bulkhead and the flange comprises drilling holes through the bulkhead interface surface and applying permanent fasteners through the holes (operation 2720).

In some illustrative examples, the aft pressure bulkhead is lifted and placed using mechanical fasteners. In these illustrative examples, method 2700 installs temporary fasteners through the aft pressure bulkhead (operation 2722). In these illustrative examples, method 2700 lifts the aft pressure bulkhead by the temporary fasteners prior to aligning the aft pressure bulkhead (operation 2724).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operation 2702 through operation 2724 of FIG. 27 may be optional.

Figure 28:
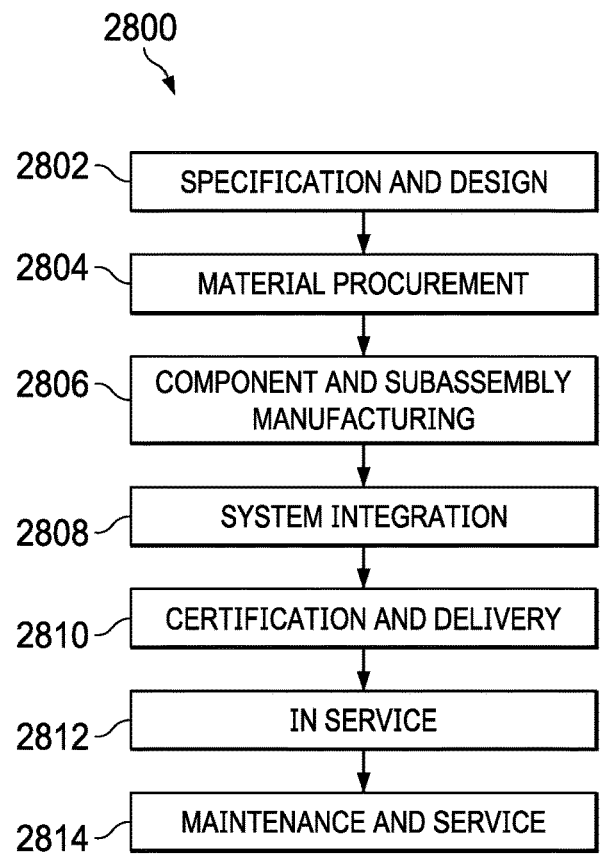
FIG. 28 is an illustration of a block diagram of an aircraft manufacturing and service method in accordance with an illustrative embodiment.
Figure 29:
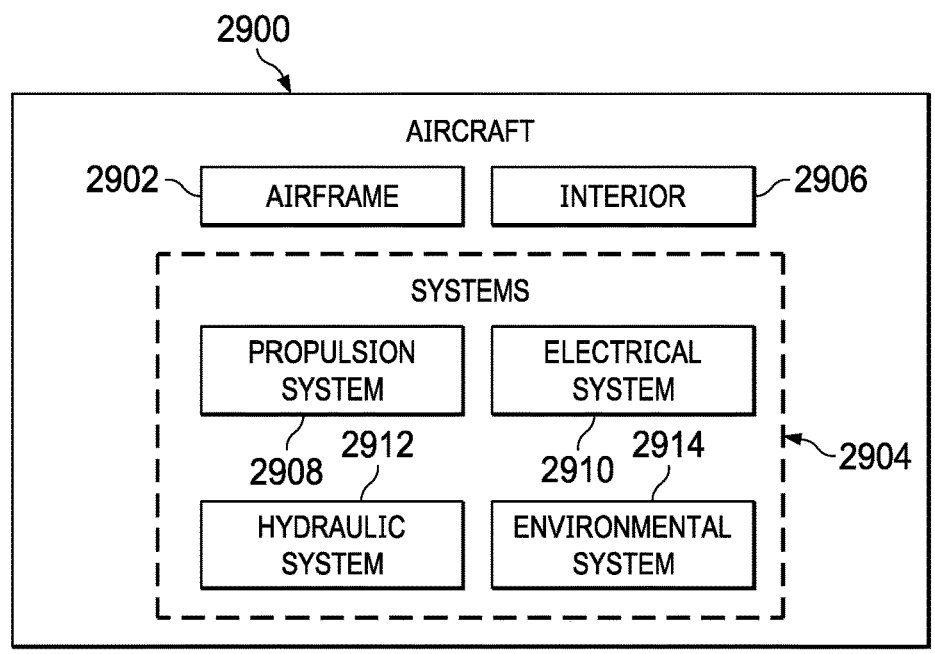
FIG. 29 is an illustration of a block diagram of an aircraft in which an illustrative embodiment may be implemented.

Illustrative embodiments of the present disclosure may be described in the context of aircraft manufacturing and service method 2800 as shown in FIG. 28 and aircraft 2900 as shown in FIG. 29. Turning first to FIG. 28, an illustration of an aircraft manufacturing and service method is depicted in accordance with an illustrative embodiment. During preproduction, aircraft manufacturing and service method 2800 may include specification and design 2802 of aircraft 2900 in FIG. 29 and material procurement 2804.

During production, component and subassembly manufacturing 2806 and system integration 2808 of aircraft 2900 takes place. Thereafter, aircraft 2900 may go through certification and delivery 2810 in order to be placed in service 2812. While in service 2812 by a customer, aircraft 2900 is scheduled for routine maintenance and service 2814, which may include modification, reconfiguration, refurbishment, or other maintenance and service.

Each of the processes of aircraft manufacturing and service method 2800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 29, an illustration of an aircraft is depicted in which an illustrative embodiment may be implemented. In this example, aircraft 2900 is produced by aircraft manufacturing and service method 2800 of FIG. 28 and may include airframe 2902 with plurality of systems 2904 and interior 2906. Examples of systems 2904 include one or more of propulsion system 2908, electrical system 2910, hydraulic system 2912, and environmental system 2914. Any number of other systems may be included.

Apparatuses and methods embodied herein may be employed during at least one of the stages of aircraft manufacturing and service method 2800. One or more illustrative embodiments may be used during at least one of component and subassembly manufacturing 2806, system integration 2808, or maintenance and service 2814 of FIG. 28. For example, the illustrative examples could be used during component and subassembly manufacturing 2806 to assemble pressure bulkhead system 102. For example, method 2600 may be used during component and subassembly manufacturing 2806 to assemble a pressure bulkhead system of aircraft 2900. Method 2600 may be used to manufacture a portion of airframe 2902 of aircraft 2900.

The illustrative examples present a pressure bulkhead system, a method of assembling the pressure bulkhead system, and a pressure bulkhead assembly support tool configured to support the components during assembly of the pressure bulkhead system. In the illustrative examples, a plurality of shims is positioned between the skin splice angles and the aft pressure bulkhead to maintain a nominal shape of a circumferential surface formed by the skin splice angles. The plurality of shims between the skin splice angles and the aft pressure bulkhead are manufactured to fill gaps identified between a scan of a flange surface formed by the skin splice angles and a scan of the bulkhead interface surface of the aft pressure bulkhead. The shimming is performed to maintain a nominal shape of the circumferential surface of the pressure bulkhead system. The plurality of the shims in the pressure bulkhead system reduces a quantity of shims between the pressure bulkhead system and a skin of a fuselage of an aircraft. Any shims placed between the pressure bulkhead system and the skin of the fuselage may have a reduced thickness in comparison to conventional shimming. In some illustrative examples, shimming between the pressure bulkhead system and the skin of the fuselage is reduced by more than half.

The pressure bulkhead assembly support tool is used to restrain the skin splice angles adjacent to each other such that a circumferential surface with a nominal shape is formed. The pressure bulkhead assembly support tool is used to index and align the aft pressure bulkhead. The pressure bulkhead assembly support tool is used to hold the skin splice angles and the aft pressure bulkhead as they are joined.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A pressure bulkhead assembly support tool comprising:
   a segmented frame having a substantially circular path;
   a plurality of circumferential force assemblies positioned along the substantially circular path and configured to restrain skin splice angles of a pressure bulkhead system such that a circumferential surface with a nominal shape is formed; and
   a plurality of alignment probes positioned along the substantially circular path and configured to hold an aft pressure bulkhead having a bulkhead interface surface.

2. The pressure bulkhead assembly support tool of claim 1, wherein each circumferential force assembly of the plurality of circumferential force assemblies comprises a circumferential surface clamp configured to apply pressure to mating edges of skin splice angles of a pressure bulkhead system and indexing pins configured to position the mating edges of the skin splice angles.

3. The pressure bulkhead assembly support tool of claim 2, wherein the circumferential surface clamp of each circumferential force assembly has a first pad configured to contact an internal surface of a respective skin splice angle and a second pad configured to contact a circumferential arc of the respective skin splice angle.

4. The pressure bulkhead assembly support tool of claim 3, wherein the second pad has an L-shape.

5. The pressure bulkhead assembly support tool of claim 1, further comprising:
   a number of indexing pins configured to interface with both the aft pressure bulkhead and a respective skin splice angle to align and provide an optional consolidation clamp force.

6. The pressure bulkhead assembly support tool of claim 1, further comprising:
   an aft pressure bulkhead stand positioned within the substantially circular path and configured to contact an inner surface of the aft pressure bulkhead.

7. The pressure bulkhead assembly support tool of claim 6, wherein the aft pressure bulkhead stand is configured to support the aft pressure bulkhead.

8. The pressure bulkhead assembly support tool of claim 6, wherein the aft pressure bulkhead stand is on a movement system such that the aft pressure bulkhead stand is movable relative to the segmented frame, the plurality of circumferential force assemblies, and the plurality of alignment probes.

9. The pressure bulkhead assembly support tool of claim 1, wherein the segmented frame is associated with a movement system, the movement system including wheels and configured to move the segmented frame to a desired location within a manufacturing environment.

10. The pressure bulkhead assembly support tool of claim 1, wherein the segmented frame comprises multiple frame segments separable from each other.

11. The pressure bulkhead assembly support tool of claim 1, wherein the plurality of alignment probes is configured to align the aft pressure bulkhead relative to the segmented frame.

12. The pressure bulkhead assembly support tool of claim 1, wherein each alignment probe of the plurality of alignment probes comprises a clamp with a probe, the probe configured to contact an external surface of the aft pressure bulkhead.

13. The pressure bulkhead assembly support tool of claim 1, wherein each alignment probe of the plurality of alignment probes comprises a probe connected to a hand knob, the probe configured to contact an internal surface of the aft pressure bulkhead.

14. The pressure bulkhead assembly support tool of claim 1, further comprising a plurality of shims configured to fill gaps between a flange surface of the skin splice angles and a bulkhead interface surface of the aft pressure bulkhead such that the circumferential surface maintains the nominal shape.

15. A pressure bulkhead assembly support tool configured to hold a pressure bulkhead system, the pressure bulkhead assembly support tool comprising:
   a segmented frame comprising multiple frame segments separable from each other;
   a plurality of circumferential force assemblies positioned on the segmented frame, wherein each circumferential force assembly of the plurality of circumferential force assemblies comprises a circumferential surface clamp configured to apply pressure to mating edges of skin splice angles of the pressure bulkhead system and indexing pins configured to position the mating edges of the skin splice angles; and
   a plurality of alignment probes positioned on the segmented frame and configured to hold a bulkhead interface surface of an aft pressure bulkhead of the pressure bulkhead system and also configured to align the aft pressure bulkhead relative to the segmented frame once the aft pressure bulkhead is lowered onto the skin splice angles, wherein a plurality of shims is positioned between the bulkhead interface surface and a flange surface of the skin splice angles.

16. The pressure bulkhead assembly support tool of claim 15, wherein the plurality of shims are attached to the flange surface of the skin splice angles and configured to fill gaps between the flange surface and the bulkhead interface surface of the aft pressure bulkhead such that a circumferential surface of the pressure bulkhead system maintains a nominal shape.

17. The pressure bulkhead assembly support tool of claim 15, wherein the circumferential surface clamp of each circumferential force assembly has a first pad configured to contact an internal surface of a respective skin splice angle and a second pad configured to contact a circumferential arc of the respective skin splice angle.

18. The pressure bulkhead assembly support tool of claim 17, wherein the second pad has an L-shape.

19. The pressure bulkhead assembly support tool of claim 15, further comprising:
an aft pressure bulkhead stand positioned within a substantially circular path of the segmented frame and configured to contact an inner surface of the aft pressure bulkhead.

20. The pressure bulkhead assembly support tool of claim 15, wherein the segmented frame is associated with a movement system, the movement system including wheels and configured to move the segmented frame to a desired location within a manufacturing environment.

* * * * *